US010223069B2

(12) United States Patent
Nakamura et al.

(10) Patent No.: US 10,223,069 B2
(45) Date of Patent: Mar. 5, 2019

(54) TIME-SERIES DATA SEARCH DEVICE AND COMPUTER READABLE MEDIUM

(71) Applicant: MITSUBISHI ELECTRIC CORPORATION, Tokyo (JP)

(72) Inventors: Takaaki Nakamura, Tokyo (JP); Makoto Imamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/503,365

(22) PCT Filed: Jan. 22, 2015

(86) PCT No.: PCT/JP2015/051688
§ 371 (c)(1),
(2) Date: Feb. 10, 2017

(87) PCT Pub. No.: WO2016/117086
PCT Pub. Date: Jul. 28, 2016

(65) Prior Publication Data
US 2018/0217812 A1    Aug. 2, 2018

(51) Int. Cl.
*G06F 7/08*         (2006.01)
*G05B 23/02*       (2006.01)
(Continued)

(52) U.S. Cl.
CPC .............. *G06F 7/08* (2013.01); *G05B 23/02* (2013.01); *G05B 23/0264* (2013.01);
(Continued)

(58) Field of Classification Search
CPC ................. G05B 23/0264; G06F 17/18; G06F 17/30964; G06F 17/30551
(Continued)

(56) References Cited

U.S. PATENT DOCUMENTS 6,845,377 B2    1/2005    Yamane et al.
8,447,705 B2    5/2013    Fujimaki et al.
(Continued)

FOREIGN PATENT DOCUMENTS

JP    2003-141159 A    5/2003
JP    2004-348594 A    12/2004
(Continued)

OTHER PUBLICATIONS

Jones et al., "Anomaly Detection in Real-Valued Multidimensional Time Series", 2014 ASE BigData/SocialCom/CyberSecurity Conference, Stanford University, May 27-31, 2014, pp. 1-9.
(Continued)

*Primary Examiner* — John H Le
(74) *Attorney, Agent, or Firm* — Birch, Stewart, Kolasch & Birch, LLP

(57) ABSTRACT

An initial segment set generation unit (120) generates an initial segment set (F) from training time-series data (S). An initial segment set sorting unit (130) sorts initial segments included in the initial segment set by the order of feature quantities. A sample segment set generation unit (140) generates a sample segment set (E) from the initial segment set. A sample segment set sorting unit (150) sorts sample segments included in the sample segment set by the order of the feature quantities. A search result distance calculation unit (160) calculates a search result distance (Z) for each of test segments by using the sample segment set.

12 Claims, 15 Drawing Sheets

(51) Int. Cl.
  *G06F 17/30* (2006.01)
  *G06F 17/18* (2006.01)
(52) U.S. Cl.
  CPC .............. *G06F 17/18* (2013.01); *G06F 17/30* (2013.01); *G06F 17/30964* (2013.01)
(58) Field of Classification Search
  USPC .................. 702/79, 149, 155, 157; 707/746; 708/520
  See application file for complete search history.

(56) References Cited

U.S. PATENT DOCUMENTS

| | | | |
|---|---|---|---|
| 8,682,824 B2 | 3/2014 | Shibuya et al. | |
| 2003/0088563 A1 | 5/2003 | Yamane et al. | |
| 2008/0140751 A1 | 6/2008 | Ide et al. | |
| 2008/0243437 A1 | 10/2008 | Ide et al. | |
| 2010/0121793 A1 | 5/2010 | Fujimaki et al. | |
| 2012/0117079 A1* | 5/2012 | Baum | G06F 17/30551 707/746 |
| 2012/0290879 A1 | 11/2012 | Shibuya et al. | |
| 2013/0060783 A1* | 3/2013 | Baum | G06F 17/30551 707/746 |

FOREIGN PATENT DOCUMENTS

| | | |
|---|---|---|
| JP | 2006-227835 A | 8/2006 |
| JP | 2006-244389 A | 9/2006 |
| JP | 2008-146353 A | 6/2008 |
| JP | 2009-70065 A | 4/2009 |
| JP | 2009-199507 A | 9/2009 |
| JP | 2009-217555 A | 9/2009 |
| JP | 4451332 B2 | 4/2010 |
| JP | 2011-34389 A | 2/2011 |
| JP | 2012-230703 A | 11/2012 |
| JP | 2013-164811 A | 8/2013 |
| JP | 2013-196665 A | 9/2013 |
| JP | 2014-81841 A | 5/2014 |
| JP | 5530019 B1 | 6/2014 |
| WO | 2008/102840 A1 | 8/2008 |
| WO | WO 2011/024382 A1 | 3/2011 |
| WO | WO 2011/036809 A1 | 3/2011 |

OTHER PUBLICATIONS

Jones et al., "Exemplar Learning for Extremely Efficient Anomaly Detection in Real-Valued Time Series", Mitsubishi Electric Research Laboratories, Inc., 2016, 201 Broadway, Cambridge, Massachusetts 02139, pp. 1-22.

Lu et al., "Two-Stage Recognition Method of Time Series Based on Symbolic Representation of Categories Obtained by Segment Classification Using the Genetic Programming and Its Applications to Prediction", vol. J88-A, No. 11, pp. 1258-1271.

Rakthanmanon et al., "Searching and Mining Trillions of Time Series Subsequences under Dynamic Time Warping", Aug. 12-16, 2012, Beijing, China, Copyright 2012 ACM.

Zakaria, "Developing Efficient Algorithms for Data Mining Large Scale High Dimensional Data", Dec. 2013, pp. 1-121.

\* cited by examiner

TIME-SERIES DATA SEARCH DEVICE AND COMPUTER READABLE MEDIUM

TECHNICAL FIELD

The present invention relates to a technique for searching time-series data.

BACKGROUND ART

An electric power plant, a chemical plant, a steel plant, a water supply and sewage plant, or the like introduces a control system for controlling a process in a plant. Likewise, a facility such as a building or a factory introduces a control system for controlling air conditioning, electricity, illumination, water supply and drainage, and so on. Meanwhile, a logging system for recording a state of an appliance is equipped in an appliance for a line in a factory, a motorcar, and a railroad car to recognize a state of an appliance.

In these systems, various types of time-series data obtained by a sensor installed at the appliance as time elapses are accumulated.

The time-series data is analyzed as follows.

Partial time-series data extracted from recent time-series data, namely, test time-series data is compared with partial time-series data extracted from past time-series data, namely, training time-series data and then, partial time-series data of the test time-series data similar to the partial time-series data of the training time-series data is searched for. Subsequently, among the partial time-series data of the test time-series data similar thereto, partial time-series data of the test time-series data least similar to the partial time-series data of the training time-series data is detected as a singularity. Thereafter, an abnormality of the appliance is detected through the detection of the singularity.

The partial time-series data is data extracted from the time-series data to have a length corresponding to a width of a sliding time window and called a segment.

A segment of the training time-series data having a distance closest to a segment of the test time-series data is extracted with respect to each of the segments of the test time-series data and then, a segment of the test time-series data having a distance farthest from the segment of the training time-series data is regarded as the singularity. A Euclidean distance and a DTW distance are widely utilized as types of the distance between segments. The DTW stands for Dynamic Time Warping.

Here, the aforementioned approach for detecting the singularity is called a simple approach.

Because distances of all combinations of the segments of the training time-series data and the segments of the test time-series data are found out, the simple approach has a considerably increased amount of computation.

Non Patent Literature 1 has proposed an approach for reducing the amount of computation by discontinuing the computation of the distances by way of an indicator having a less amount of computation than the case of the computation of the distances between the segments.

Non Patent Literature 2 has proposed an approach for reducing the amount of computation by comparing the segments of the test time-series data with a sample segment. The sample segment is called an Exemplar and generated from the training time-series data by integrating similar segments thereof.

In a case where the number of sample segments can be sufficiently narrowed down, the approach according to Non Patent Literature 2 can reduce the amount of computation more considerably than the case of the simple approach and the approach according to Non Patent Literature 1.

However, the approach according to Non Patent Literature 2 is an approach for finding out an approximate solution by sampling the training time-series data and accordingly, an error thereof, namely, an approximation error needs to be taken into account.

In the approach according to Non Patent Literature 2, as long as a test segment having a distance to the sample segment equal to or less than a threshold is present, the union of this test segment with the sample segment is repeated. As a result, the approximation error increases and the approximation error cannot be ensured to fit within an allowable range.

Besides, it is also not possible to find out the approximation error contained in the sample segment by way of quantification, an error contained in a search result cannot be evaluated as well.

Non Patent Literature 3 has disclosed the degree of complexity as a feature quantity used in the judgment of an inter-segment distance relative to the threshold.

CITATION LIST

Non Patent Literature

Non Patent Literature 1: Rakthanmanon, et al., Searching and mining trillions of time series subsequences under dynamic time warping, KDD'12 Proceedings of the 18th ACM SIGKDD international conference on Knowledge discovery and data mining Pages 262-270.

Non Patent Literature 2: M Jones, et al., Anomaly Detection in Real-Valued Multidimensional Time Series, ASE Stanford University Conference, May 2014; Paper No. 027.

Non Patent Literature 3: Jesin Zakaria, Developing Efficient Algorithms for Data Mining Large Scale High Dimensional Data, UC Riverside Electronic Theses and Dissertations, 2013., https://escholarship.org/uc/item/660316zp

SUMMARY OF INVENTION

Technical Problem

An object of the present invention is to enable high-speed generation of a sample segment set used in a search of time-series data while ensuring an approximation error thereof to fit within an allowable range.

Solution to Problem

A time-series data search device according to the present invention includes:

an initial segment set generation unit to generate a plurality of training segments each obtained by extracting W number of data values in the order of the time series from training time-series data constituted by a plurality of data values arranged along the time series, to generate a plurality of training temporary segment sets each constituted by one or more training segments arranged in the order of the time series, to calculate, as an initial segment, W number of data values representing a coordinate value of a centroid of the training temporary segment set with respect to each of the training temporary segment sets when W number of data values included in each of the training segments in the training temporary segment set are treated as a coordinate value in a W-dimensional coordinate system, and to generate an initial segment set constituted by the initial segment for each of the training temporary segment sets; and a sample segment set generation unit to divide the initial segment set into an initial temporary segment set made up of the initial segment constituted by data values representing a coordinate value included in a figure with respect to each of W-dimensional figures having a condition radius serving as a condition for a radius, and to generate a sample segment set including a sample segment constituted by W number of data values representing a coordinate value of the centroid of the figure by the initial temporary segment set with respect to each of the initial temporary segment sets.

Advantageous Effects of Invention

According to the present invention, a sample segment set used in a search of time-series data can be generated at a high speed.

DESCRIPTION OF EMBODIMENTS

First Embodiment

Figure 1:
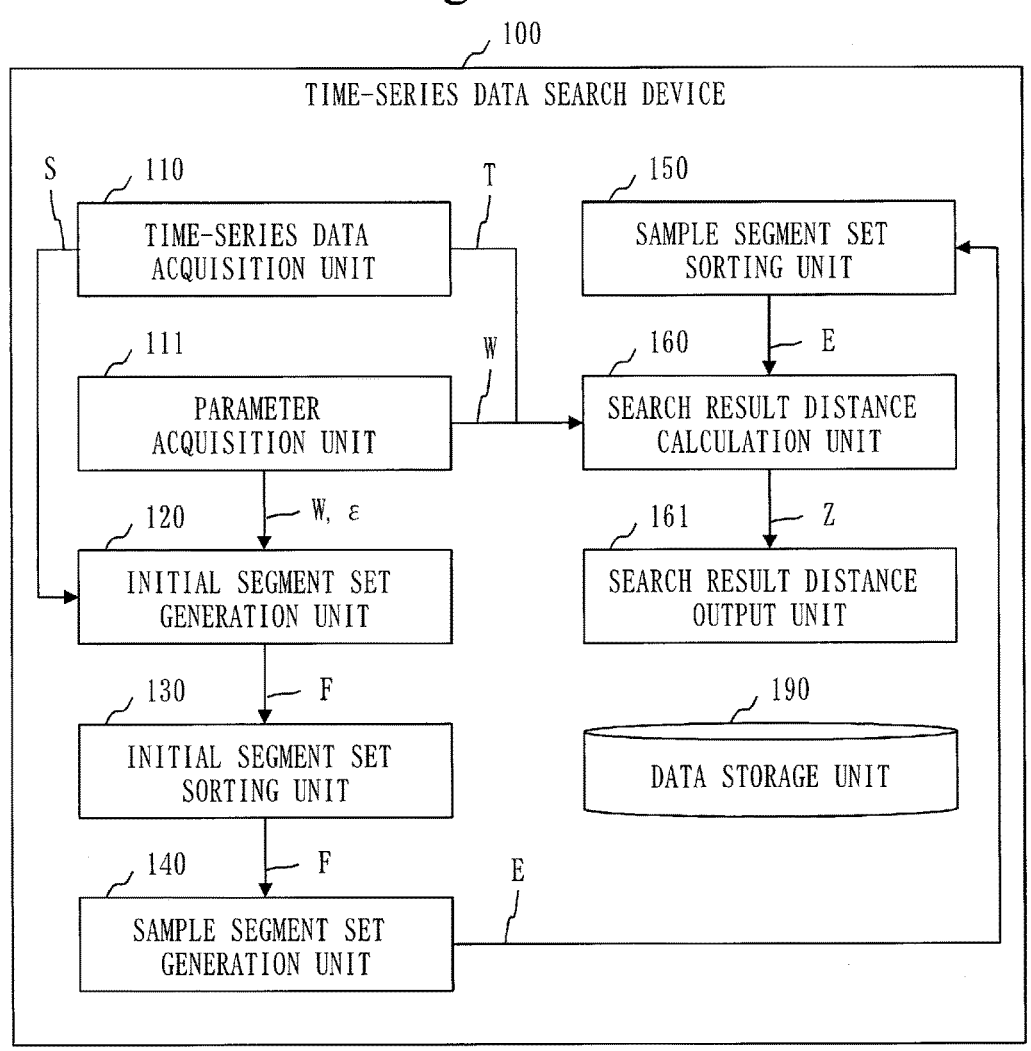
FIG. 1 is a function configuration diagram of a time-series data search device 100 according to a first embodiment.

A mode for generating a sample segment set used in a search of time-series data at a high speed will be described on the basis of FIG. 1 to FIG. 7.

A way of thinking on a similarity search of the time-series data will be described.

Partial time-series data cut out from the time-series data through a window having a width W can be deemed as a W-dimensional vector. Accordingly, processing for finding out a distance between partial time-series data of training time-series data, namely, a training segment and partial time-series data of test time-series data, namely, a test segment can be deemed as processing for finding out a distance between coordinates of two points in a W-dimensional space.

Meanwhile, the detection of a singularity in the test time-series data can be deemed as processing for locating a test segment most away from a set of the training segments.

Additionally, the similarity search of the time-series data can be deemed as a neighbor search in the W-dimensional space.

First to third characteristics included in the time-series data will be described.

The first characteristic is continuity of data values. Most of measurement values for a physical phenomenon such as a temperature change continuously. In addition, the measurement values for a mechanically controlled appliance do not change abruptly. For example, because a sudden change of a voltage acts as a cause of a failure in an appliance, a voltage applied to the appliance is changed gradually.

The second characteristic is periodicity of data values. The operation of the appliance is tightly correlated with an activity of a human or a climatic phenomenon. The time-series data of such an appliance has periodicity in units of one day, one week, one year, or the like. Likewise, similar patterns appear repeatedly in the time-series data of an appliance that operates in line with a program in a repetitive manner.

The third characteristic is localization of data values. The measurement values included in the time-series data of a controlled appliance are values within a predetermined range. Segments of such time-series data concentrate on a limited region in a multi-dimensional space. For example, a segment of the time-series data of an appliance controlled such that a positive value is obtained for the measurement value is included in positive regions in all dimensions of the multi-dimensional space.

*Description of Configuration*

A function configuration of a time-series data search device 100 will be described on the basis of FIG. 1.

The time-series data search device 100 includes a time-series data acquisition unit 110, a parameter acquisition unit 111, an initial segment set generation unit 120, an initial segment set sorting unit 130, and a sample segment set generation unit 140. The time-series data search device 100 further includes a sample segment set sorting unit 150, a search result distance calculation unit 160, a search result distance output unit 161, and a data storage unit 190.

The time-series data acquisition unit 110 acquires training time-series data S and test time-series data T input to the time-series data search device 100.

Each of the training time-series data S and the test time-series data T is time-series data constituted by a plurality of data values arranged along the time series.

A sliding width W and an approximation error e input to the time-series data search device 100 is input to the parameter acquisition unit 111.

The sliding width W represents the number of data values included in the training segment extracted from the training time-series data S and the test segment extracted from the test time-series data T. The sliding width W is also called a sliding time window width.

The approximation error ε represents an allowable size of error. The parameter acquisition unit 111 may calculate the approximation error ε by using a parameter for calculating the approximation error ε.

The initial segment set generation unit 120 generates the plurality of training segments each obtained by extracting W number of data values from the training time-series data S in the order of the time series and then generates a plurality of training temporary segment sets each constituted by one or more training segments arranged in the order of the time series. The initial segment set generation unit 120 calculates an initial segment with respect to each of the training temporary segment sets. The initial segment is W number of data values representing a coordinate value of a centroid of the training temporary segment set when W number of data values included in each of the training segments in the training temporary segment set are treated as a coordinate value in a W-dimensional coordinate system. Subsequently, the initial segment set generation unit 120 generates an initial segment set F constituted by the initial segment for each of the training temporary segment sets.

In a case where the training temporary segment set includes the plurality of training segments, distances between a top training segment in the order of the time series among the plurality of training segments and the rest of the training segments are equal to or less than a condition radius ε/2.

The initial segment set sorting unit 130 calculates a feature quantity of the initial segment with respect to each of the initial segments included in the initial segment set F by using data values included in the initial segment. Subsequently, the initial segment set sorting unit 130 sorts the initial segments included in the initial segment set F by the order of the feature quantities.

The sample segment set generation unit 140 divides the initial segment set F into one or more initial temporary segment sets.

The initial temporary segment set is made up of the initial segment constituted by data values representing a coordinate value included in a figure with respect to each of W-dimensional figures (spheres B described later) having the condition radius ε/2 serving as a condition for the radius. Subsequently, the sample segment set generation unit 140 generates a sample segment set E including the sample segment for each of the initial temporary segment sets. The sample segment is constituted by W number of data values representing a coordinate value of the centroid of the figure by the initial temporary segment set. The centroid of the figure can be also regarded as the center of the figure in different words.

The initial temporary segment set is constituted by one or more initial segments included in a first figure. The first figure is a figure including the coordinate value represented by a top initial segment among the initial segment set F after being sorted.

The initial segments other than the top initial segment included in a first initial temporary segment set are judged through initial segment judgment. The initial segment judgment is processing that judges whether each of the initial segments is included in the first figure in the order starting from a subsequent initial segment to the top initial segment.

In a case where a feature quantity difference falls within a feature quantity difference range serving as a condition for the feature quantity difference, the initial segment judgment is carried out on a selected initial segment. This feature quantity difference is a difference between the feature quantity of each of the initial segments selected in the order starting from the subsequent initial segment and the feature quantity of a first centroid, namely, the centroid of the first figure, which is calculated from a coordinate value of the first centroid.

In a case where the feature quantity difference does not fall within the feature quantity difference range, the initial segment judgment is not carried out on the selected initial segment and its following initial segments.

In the initial segment judgment on the selected initial segment, the selected initial segment is judged to be included in the first figure when a distance between a coordinate by a coordinate value represented by the selected initial segment and a coordinate of the first centroid is equal to or less than the condition radius ε/2.

The feature quantity of the initial segment is an average value of data values included in the initial segment.

The feature quantity of the first centroid is an average value of data values when a coordinate value of the centroid of the first figure is treated as W number of data values.

The sample segment set sorting unit 150 calculates the feature quantity of the sample segment with respect to each of the sample segments included in the sample segment set E by using data values included in the sample segment. Subsequently, the sample segment set sorting unit 150 sorts the sample segments included in the sample segment set E by the order of the feature quantities.

The search result distance calculation unit 160 generates the plurality of test segments each obtained by extracting W number of data values from the test time-series data T in the order of the time series. The search result distance calculation unit 160 calculates an inter-segment distance between the test segment and the sample segment with respect to each combination of the test segment and the sample segment included in the sample segment set E. Subsequently, with respect to each of the test segments, the search result distance calculation unit 160 selects the inter-segment distance between the test segment and one of the sample segments as a search result distance Z.

The search result distance Z serves as a least inter-segment distance.

The search result distance output unit 161 outputs the search result distance for each of the test segments.

The data storage unit 190 stores data used or generated by the time-series data search device 100 or data input thereto or output therefrom.

Figure 2:
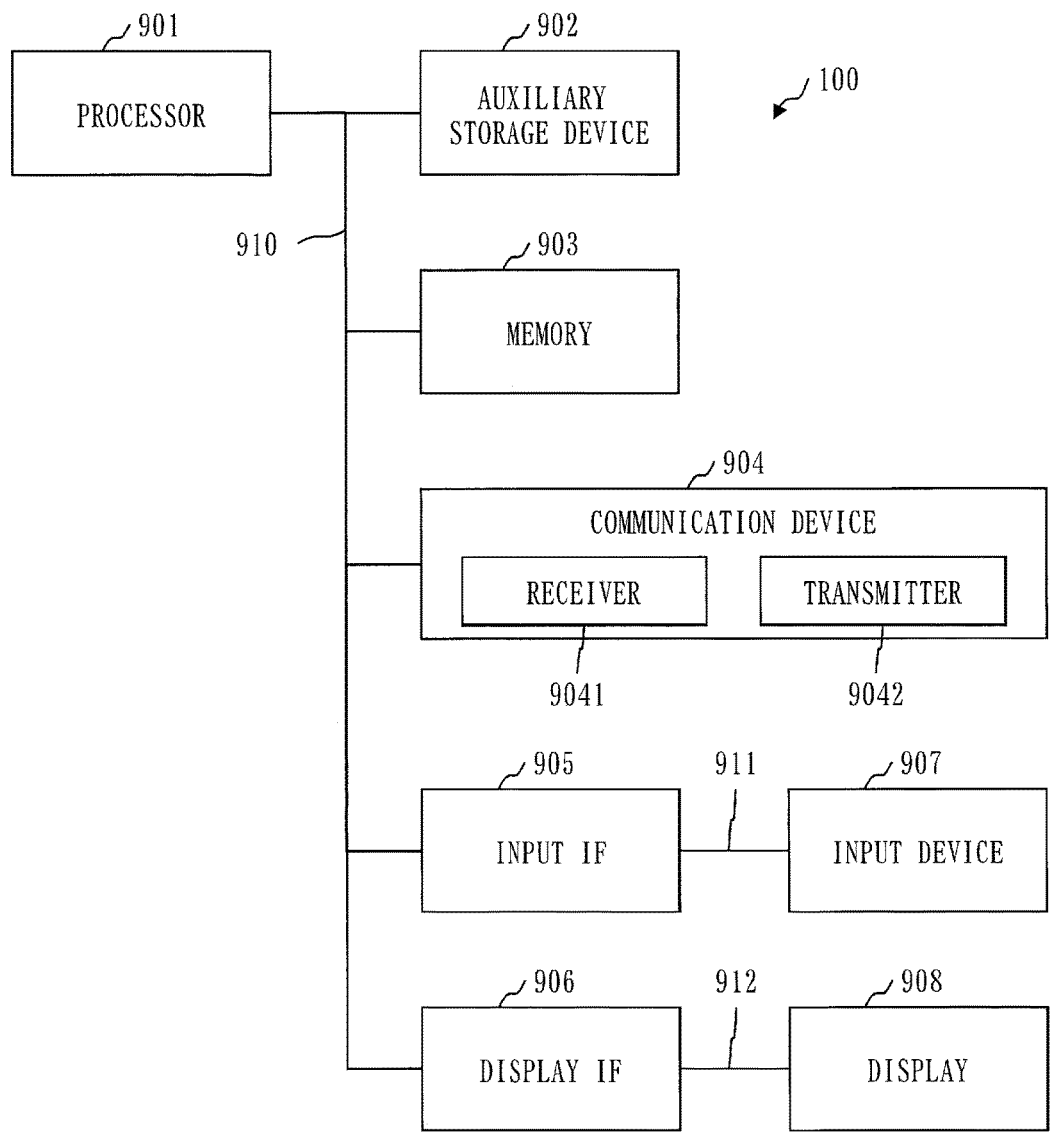
FIG. 2 is a hardware configuration diagram of the time-series data search device 100 according to the first embodiment.

An exemplary hardware configuration of the time-series data search device 100 will be described on the basis of FIG. 2.

The time-series data search device 100 is a computer provided with hardware such as a processor 901, an auxiliary storage device 902, a memory 903, a communication device 904, an input interface 905, and a display interface 906.

The processor 901 is connected to other pieces of hardware via a signal line 910. The input interface 905 is connected to an input device 907 via a cable 911. The display interface 906 is connected to a display 908 via a cable 912.

The processor 901 is an IC (Integrated Circuit) that carries out processing and controls other pieces of hardware. Examples of the processor 901 include a CPU (Central Processing Unit), a DSP (Digital Signal Processor), and a GPU (Graphics Processing Unit).

Examples of the auxiliary storage device 902 include a ROM (Read Only Memory), a flash memory, and a HDD (Hard Disk Drive).

Examples of the memory 903 include a RAM (Random Access Memory).

The communication device 904 is provided with a receiver 9041 that receives data and a transmitter 9042 that transmits data. For example, the communication device 904 is a communication chip or a NIC (Network Interface Card).

The input interface 905 is a port to which the cable 911 is connected and an example of the port is a USB (Universal Serial Bus) terminal.

The display interface 906 is a port to which the cable 912 is connected and an example of the port is a USB terminal or a HDMI (High Definition Multimedia Interface) terminal. The HDMI is a registered trademark.

For example, the input device 907 is a mouse, a keyboard, or a touch panel.

Examples of the display 908 include a LCD (Liquid Crystal Display).

An OS (Operating System) is stored in the auxiliary storage device 902. In addition, the auxiliary storage device 902 stores a program that realizes functions of the "unit" provided in the time-series data search device 100, including the time-series data acquisition unit 110, the parameter acquisition unit 111, the initial segment set generation unit 120, the initial segment set sorting unit 130, the sample segment set generation unit 140, the sample segment set sorting unit 150, the search result distance calculation unit 160, and the search result distance output unit 161.

At least a portion of the OS is loaded to the memory 903 and, while executing the OS, the processor 901 executes the program that realizes functions of the "unit". The program that realizes functions of the "unit" is loaded to the memory 903 to be read by the processor 901 and then executed by the processor 901.

Note that the time-series data search device 100 may be provided with the plurality of processors 901 such that the program that realizes functions of the "unit" is executed by the plurality of processors 901 in coordination with one another.

Data, information, a signal value, a variable value, and so on indicating a result of processing by the "unit" are stored in the memory 903, the auxiliary storage device 902, a register within the processor 901, or a cache memory within the processor 901.

The "unit" may be implemented as "circuitry". The "unit" may be read as "circuits", "processes", "procedures", or "processing".

The "circuit" and the "circuitry" are a concept that implicates a processing circuit such as the processor 901, a logic IC, a GA (Gate Array), an ASIC (Application Specific Integrated Circuit), and a FPGA (Field-Programmable Gate Array).

*Description of Operation*

Overviews of respective items of processing constituting a time-series data search method by the time-series data search device 100 will be described on the basis of FIG. 3. Thereafter, details of the respective items of processing will be described.

S110 is initial segment set generation processing.

At S110, the initial segment set generation unit 120 generates the initial segment set F from the training time-series data S.

S120 is initial segment set sorting processing.

At S120, the initial segment set sorting unit 130 calculates the feature quantity with respect to each of the initial segments included in the initial segment set F and then sorts the initial segments included in the initial segment set F by the ascending order of the feature quantities.

S130 is sample segment set generation processing.

At S130, the sample segment set generation unit 140 generates the sample segment set E from the initial segment set F after being sorted.

S140 is sample segment sorting processing.

At S140, the sample segment set sorting unit 150 calculates the feature quantity with respect to each of the sample segments included in the sample segment set E and then sorts the sample segments included in the sample segment set E by the ascending order of the feature quantities.

S150 is search result distance calculation processing.

At S150, the search result distance calculation unit 160 calculates the search result distance Z for each of the test segments included in the test time-series data T by using the sample segment set E.

S160 is search result distance output processing.

At S160, the search result distance output unit 161 outputs the search result distance Z for each of the test segments.

Notations used in the following description will be described.

The training time-series data S is expressed as S={S[0], S[1], ..., S[M−1]} by using a data length M. Specifically, the training time-series data S is constituted by M number of data values from S[0] to S[M−1].

An ith training segment $S_i$ is expressed as $S_i$=S[i:i+W−1] by using the sliding width W. Specifically, the ith training segment $S_i$ is constituted by W number of data values from S[i] to S[i+W−1].

The test time-series data T is expressed as T={T[0], T[1], ..., T[N−1]} by using a data length N. Specifically, the test time-series data T is constituted by N number of data values from T[0] to T[N−1].

An ith test segment $T_i$ is expressed as $T_i$=T[i:i+W−1] by using the sliding width W. Specifically, the ith test segment $T_i$ is constituted by W number of data values from T[i] to T[i+W−1].

The initial segment set generation processing (S110) will be described on the basis of FIG. 4.

At S111, the initial segment set generation unit 120 initializes the initial segment set F. The initialized initial segment set F does not include any initial segment.

Processing from S112 to S116 is repeatedly carried out until the value of a variable i which is incremented from zero reaches M−W+1. The training segment $S_i$ is a training segment with a number indicated by the value of the variable i. M−W+1 represents a number given to a last training segment. In FIG. 4, a loop of processing from S112 to S117 is regarded as a first loop.

At S112, the initial segment set generation unit 120 initializes a training temporary segment set $U_s$ and then adds the training segment $S_i$ to the training temporary segment set $U_s$. At this time, the training temporary segment set $U_s$ includes the training segment $S_i$ alone.

Processing from S113 to S115 is repeatedly carried out until the value of a variable j which is incremented from i+1 reaches M−W+1. A training segment $S_j$ is a training segment with a number indicated by the value of the variable j. In FIG. 4, a loop of processing from S113 to S115 is regarded as a second loop.

At S113, the initial segment set generation unit 120 calculates an inter-segment distance d between the training segment $S_i$ and the training segment $S_j$. The type of this inter-segment distance d is a Euclidean distance.

At S114, the initial segment set generation unit 120 judges whether the inter-segment distance d is no more than $\varepsilon/2$.

When the inter-segment distance d is equal to or less than ε/2 (YES), the processing proceeds to S115.

When the inter-segment distance d is more than ε/2 (NO), the processing proceeds to S116.

At S115, the initial segment set generation unit 120 adds the training segment $S_j$ to the training temporary segment set $U_s$.

At S116, the initial segment set generation unit 120 calculates the centroid of coordinates represented by the respective training segments included in the training temporary segment set $U_s$. W number of data values representing coordinates of this centroid serve as the initial segment.

A centroid $Cent(U_s)$ of the training temporary segment set $U_s$ is found out by following expression <1>.

In expression <1>, $U_S$ is assumed as $\{S_0, S_1, \ldots, S_h\}$ and $|U_S|$ represents a data length (h+1). In addition, $F_n[j]$ represents a jth element of an initial segment $F_n$.

[Formula 1]

$$Cent(U_S) = \{F_n[0], F_n[1], \ldots, F_n[W-1]\} \qquad <1>$$

$$F_n[j] = \frac{1}{|U_S|}\sum_{k=0}^{i} S_k[j], (0 \le j \le W-1)$$

Subsequently, the initial segment set generation unit 120 adds the initial segment to the initial segment set F.

After S116, the processing leaves the second loop to proceed to S117.

At S117, the initial segment set generation unit 120 updates the value of the variable i to the value of the variable j.

Figure 4:
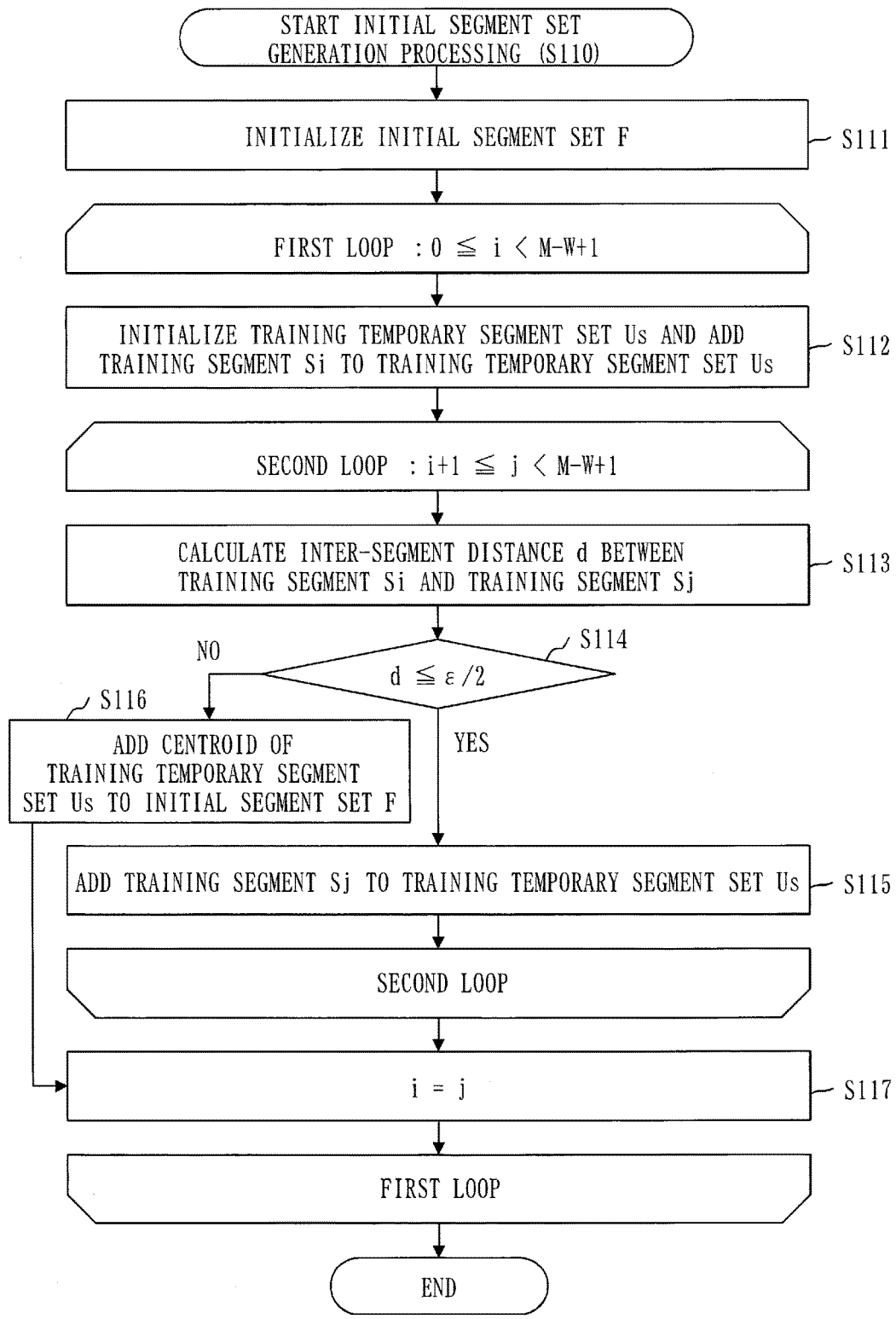
FIG. 4 is a flowchart of initial segment set generation processing (S110) according to the first embodiment.

The initial segment set F can be generated through the processing in FIG. 4 only by scanning the training time-series data S in one direction from the top to the end.

The initial segment set generation processing (S110) is processing utilizing the first characteristic of the time-series data, namely, the continuity of data values, where coordinates of consecutive segments are supposed to be positioned in a close distance from each other. Therefore, similar segments can be located only by exploring for consecutive segments.

Subsequently, the training time-series data S is scanned from the top, the training temporary segment set $U_s$, which is a set of the training segments included in a sphere having a radius of ε/2, is extracted and then, the centroid of the training temporary segment set $U_s$ is calculated as the initial segment.

The initial segment set sorting processing (S120) will be described.

The initial segment set sorting unit 130 calculates the feature quantity with respect to each of the initial segments included in the initial segment set F and then sorts the initial segments included in the initial segment set F by the ascending order of the feature quantities.

The feature quantity of the initial segment is an average value of W number of data values included in the initial segment.

When the initial segment $F_n$ is expressed as $F=\{F_n[0], F[1], \ldots, F_n[W-1]\}$, an average value $Mean(F_n)$ of the initial segment $F_n$ can be expressed by following expression <2>.

The average value $Mean(F_n)$ of the initial segment $F_n$ means that the coordinates of the initial segment $F_n$ are positioned on a plane in the W-dimensional space defined by following expression <3>. In expression <3>, $X_i$ represents a coordinate value on an ith coordinate axis. This plane in the W-dimensional space is a plane passing through W number of coordinates $\{(W*Mean(F_n), 0, \ldots, 0), (0, W*Mean(F_n), \ldots, 0), \ldots, (0, 0, \ldots, W*Mean(F_n))\}$.

[Formula 2]

$$Mean(F_n) = \frac{1}{W}\sum_{i=0}^{W-1} F_n[i] \qquad <2>$$

$$x_0 + x_1 + \ldots + x_{W-1} = W * Mean(F_n) \qquad <3>$$

The initial segment set sorting processing (S120) is processing for utilizing the second characteristic of the time-series data, namely, the periodicity of data values.

When the initial segments included in the initial segment set F are sorted by the ascending order of the average values, the initial segments not close to each other from the viewpoint of time but close to each other from the viewpoint of distance can be arranged closely to each other.

The sample segment set generation processing (S130) will be described on the basis of FIG. 5.

At S130-1, the sample segment set generation unit 140 initializes the sample segment set E. The initialized sample segment set E does not include any sample segment.

Processing from S131-1 to S131-6 is repeatedly carried out until the value of a variable i which is incremented from zero reaches a value r. The value r represents a number given to a last initial segment included in the initial segment set F. However, in a case where the value of the variable i represents a number given to the initial segment that has been removed from the initial segment set F, processing on the removed initial segment is skipped and then, the value of the variable i is incremented.

An initial segment $F_i$ is an initial segment with a number indicated by the value of the variable i. In FIG. 5, a loop of processing from S131-1 to S131-6 is regarded as a first loop.

At S131-1, the sample segment set generation unit 140 determines a centroid C of a sphere B including the initial segment $F_i$. The radius of the sphere B is ε/2.

The centroids C indicated in the following (1) to (3) are considered as the centroid C of the sphere B.

(1) A coordinate value represented by the initial segment $F_i$ serves as the centroid C.

(2) When the inter-segment distance d between a coordinate value of the initial segment $F_i$ and a coordinate value of an initial segment $F_k$ is equal to or less than ε, a coordinate value of a middle point between the coordinate value of the initial segment $F_i$ and the coordinate value of the initial segment $F_k$ serves as the centroid C. The initial segment $F_k$ is a first initial segment or a last initial segment satisfying a condition for the inter-segment distance, which will be described later. The initial segment $F_k$ may be an initial segment having a most inter-segment distance among the initial segments satisfying the condition for the inter-segment distance. Note that the initial segment $F_k$ is an initial segment following the initial segment $F_i$.

(3) The time-series data has the localization of data values as described above as the third characteristic.

Accordingly, coordinates of segments are thought to be distributed around a fundamental vector V passing through an origin and coordinates $(1, 1, \ldots, 1)$ in the W-dimensional space. In this case, a coordinate value of a coordinate reached by advancing in a positive direction from a coordinate of the initial segment $F_i$ by $\varepsilon/2$ along a vector passing through the coordinate of the initial segment $F_i$ and parallel to the fundamental vector V serves as the centroid C. This centroid C is a value obtained by adding $\varepsilon/(2*\sqrt{W})$ to the initial segment $F_i[1]$ ($0 \le 1 < W$).

At S131-1, once the centroid C of the sphere B is determined, the sample segment set generation unit 140 calculates a feature quantity D(C) of the centroid C.

A method for calculating the feature quantity D(C) of the centroid C is same as the method for calculating the feature quantity of the initial segment $F_n$ at S120. However, $F_n$ is replaced with C in aforementioned expression <2>.

At S131-2, the sample segment set generation unit 140 initializes an initial temporary segment set $U_f$ and then adds the initial segment $F_i$ to the initial temporary segment set $U_f$. At this time, the initial temporary segment set $U_f$ includes the initial segment $F_i$ alone.

At S131-3, the sample segment set generation unit 140 removes the initial segment $F_i$ from the initial segment set F.

At S131-4, the sample segment set generation unit 140 sets −1 for a variable Skip. The variable Skip is a variable indicating a number given to an initial segment $F_i$ first confirmed not to be included in the sphere B.

At S132, the sample segment set generation unit 140 carries out second loop processing. The second loop processing (S132) will be described later.

At S131-5, the sample segment set generation unit 140 adds the centroid C to the sample segment set E.

At S131-6, the sample segment set generation unit 140 updates the value of the variable i.

When the value of the variable Skip is a positive value, the value of the variable i is updated to the value of the variable Skip.

When the value of the variable Skip is a negative value (−1), the value of the variable i is updated to the value of a variable j set at the second loop processing (S132).

The second loop processing (S132) will be described on the basis of FIG. 6.

Processing from S132-1 to S132-7 is repeatedly carried out until the value of the variable j which is incremented from i+1 reaches a value r. However, in a case where the value of the variable j represents a number given to the initial segment that has been removed from the initial segment set F, processing on the removed initial segment is skipped and then, the value of the variable j is incremented.

An initial segment $F_j$ is an initial segment with a number indicated by the value of the variable j. In FIG. 6, a loop of processing from S132-1 to S132-6 is regarded as a second loop.

At S132-1, the sample segment set generation unit 140 judges whether the feature quantity difference between a feature quantity $D(F_j)$ of the initial segment $F_j$ and the feature quantity D(C) of the centroid C is more than $\varepsilon/(2\sqrt{W})$ (the condition for the inter-segment distance). The feature quantity $D(F_j)$ of the initial segment $F_j$ is a value calculated at the initial segment set sorting processing (S120).

When the feature quantity difference is more than $\varepsilon/(2\sqrt{W})$, a distance between a plane including the coordinates of the initial segment $F_j$ and a plane including the coordinates of the centroid C exceeds $\varepsilon/2$ and accordingly, the coordinates of the initial segment $F_j$ are positioned outside the sphere B. Therefore, even in a case where a distance between the coordinates of the initial segment $F_j$ and the coordinates of the centroid C is not directly calculated, the initial segment $F_j$ whose coordinates are positioned outside the sphere B can be judged.

A conditional expression $|D(F_j)-D(C)|>\varepsilon/(2*\sqrt{W})$ at S132-1 is obtained on the basis of following expression <4> and expression <5>.

Expression <4> works as an expression that finds out a distance between a plane including first coordinates having an average value of $D_1$ and a plane including second coordinates having an average value of $D_2$ in the W-dimensional space.

Accordingly, in order to obtain a distance between the first coordinates and the second coordinates equal to or less than $d_\varepsilon$, expression <5> needs to be satisfied.

[Formula 3]

$$|D_1 - D_2| \times \sqrt{W} \qquad \qquad <4>$$

$$|D_1 - D_2| \le \frac{d_\varepsilon}{\sqrt{W}} \qquad \qquad <5>$$

Figure 5:
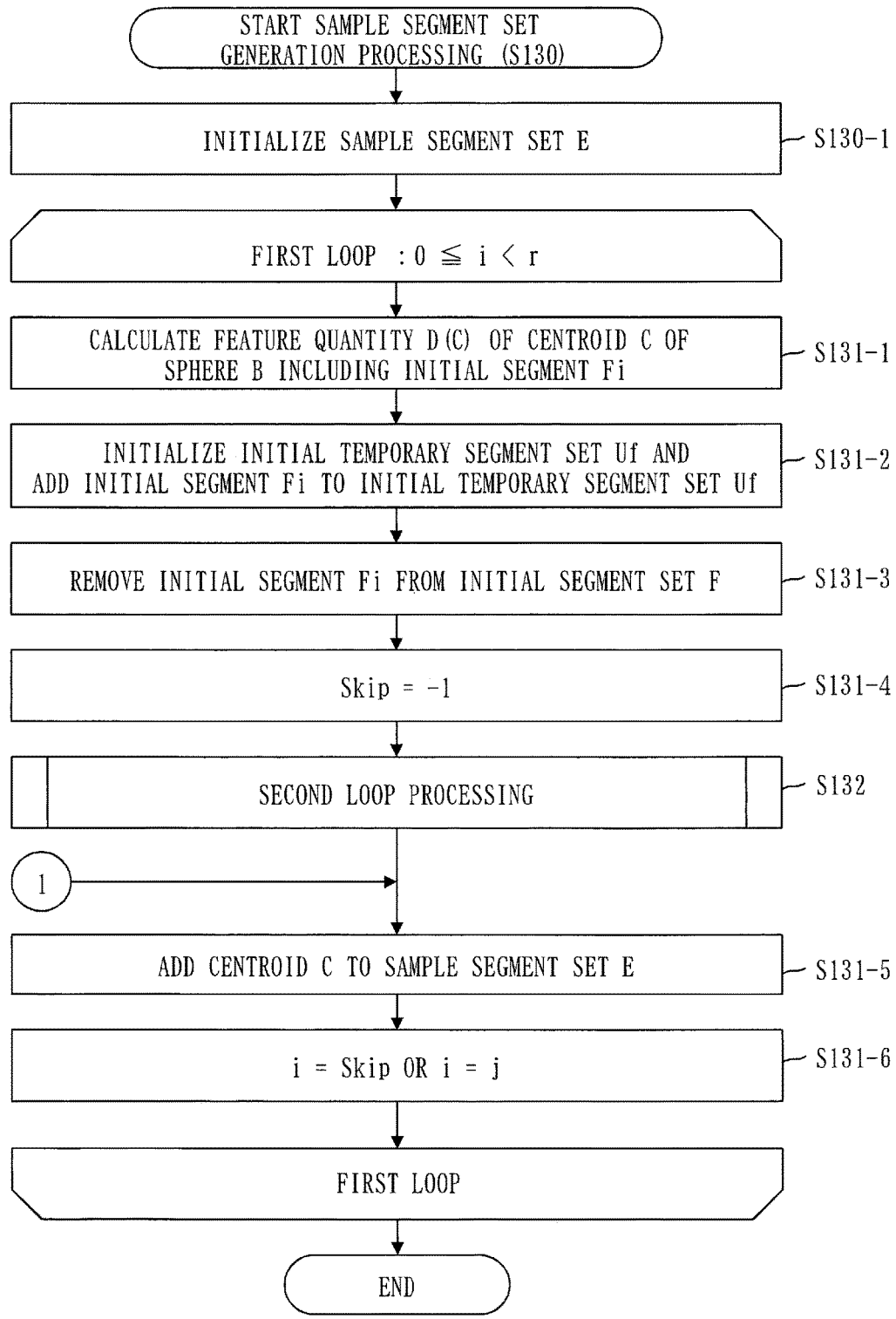
FIG. 5 is a flowchart of sample segment set generation processing (S130) according to the first embodiment.

When the feature quantity difference is more than $\varepsilon/(2*\sqrt{W})$ (YES), the processing leaves the second loop to proceed to S131-5 (refer to FIG. 5).

When the feature quantity difference is equal to or less than $\varepsilon/(2*\sqrt{W})$ (NO), the processing proceeds to S132-2.

At S132-2, the sample segment set generation unit 140 calculates the inter-segment distance d serving as a distance between the coordinates of the centroid C and the coordinates of the initial segment $F_j$. The type of this inter-segment distance d is a Euclidean distance.

At S132-3, the sample segment set generation unit 140 judges whether the inter-segment distance d is no more than $\varepsilon/2$.

When the inter-segment distance d is equal to or less than $\varepsilon/2$ (YES), the processing proceeds to S132-4.

When the inter-segment distance d is more than $\varepsilon/2$ (NO), the processing proceeds to S132-6.

At S132-4, the sample segment set generation unit 140 adds the initial segment $F_j$ to the initial temporary segment set $U_f$.

At S132-5, the sample segment set generation unit 140 removes the initial segment $F_j$ from the initial segment set F.

At S132-6, when the variable Skip is a negative value (−1), the sample segment set generation unit 140 sets the value of the variable j for the variable Skip. When the variable Skip is a value other than the negative value, no action is carried out.

Figure 6:
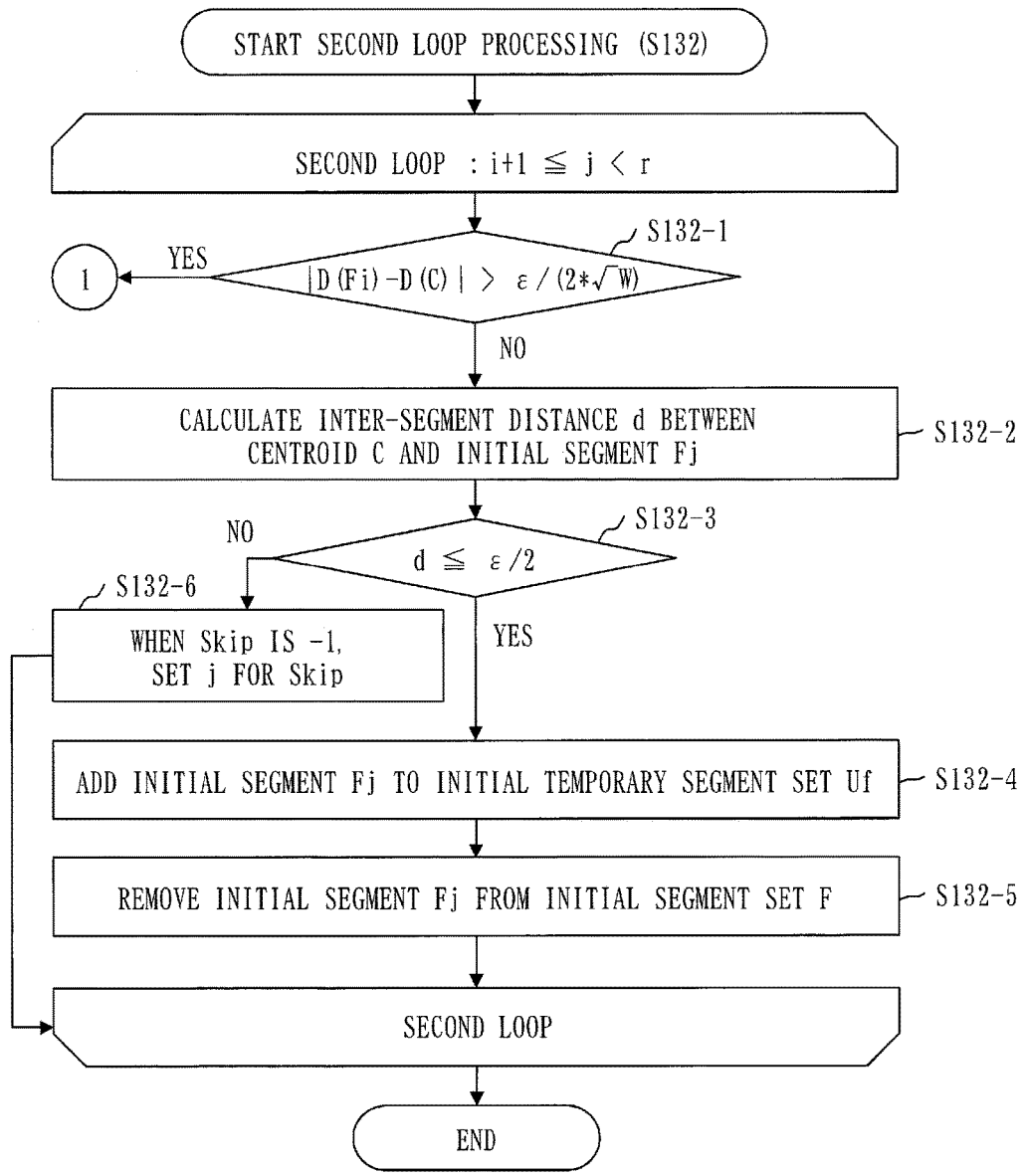
FIG. 6 is a flowchart of second loop processing (S132) in the sample segment set generation processing (S130) according to the first embodiment.

The sample segment set E can be generated through the processing in FIG. 5 and FIG. 6 only by scanning the initial segment set F in one direction from the top to the end.

The sample segment sorting processing (S140) will be described.

The sample segment set sorting unit 150 calculates the feature quantity with respect to each of the sample segments included in the sample segment set E and then sorts the sample segments included in the sample segment set E by the ascending order of the feature quantities.

A method for calculating the feature quantity of a sample segment $E_n$ is same as the method for calculating the feature quantity of the initial segment $F_n$ at S120. However, $F_n$ is replaced with $E_n$ in aforementioned expression <2>.

Figure 7:
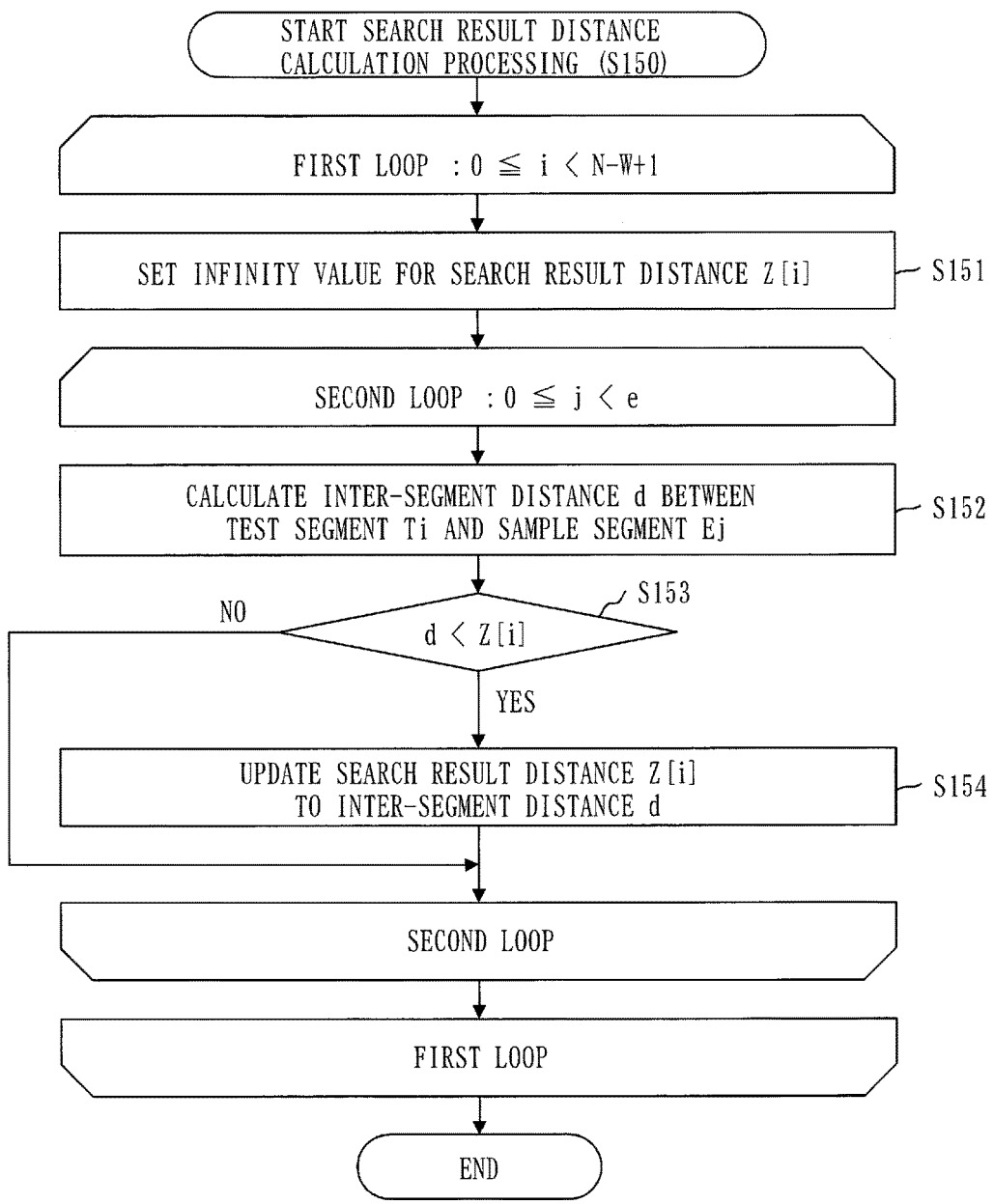
FIG. 7 is a flowchart of search result distance calculation processing (S150) according to the first embodiment.

The search result distance calculation processing (S150) will be described on the basis of FIG. 7.

Processing from S151 to S154 is repeatedly carried out until the value of a variable i which is incremented from zero reaches N−W+1. The test segment $T_i$ is a test segment with a number indicated by the value of the variable i. N−W+1 represents a number given to a last test segment. A search result distance Z[i] represents the search result distance Z of the test segment $T_i$. In FIG. 7, a loop of processing from S151 to S154 is regarded as a first loop.

At S151, the search result distance calculation unit 160 sets an infinity value for the search result distance Z[i].

Processing from S152 to S154 is repeatedly carried out until the value of a variable j which is incremented from zero reaches a value e. The value e represents a number given to a last sample segment included in the sample segment set E. In FIG. 7, a loop of processing from S152 to S154 is regarded as a second loop.

At S152, the search result distance calculation unit 160 calculates the inter-segment distance d between the test segment $T_i$ and a sample segment $E_j$. The type of this inter-segment distance d is a Euclidean distance. Alternatively, the type of this inter-segment distance d may be a DTW distance or another type of distance.

At S153, the search result distance calculation unit 160 judges whether the inter-segment distance d is smaller than the search result distance Z[i].

When the inter-segment distance d is smaller than the search result distance Z[i] (YES), the processing proceeds to S154.

When the inter-segment distance d is equal to or larger than the search result distance Z[i] (NO), the processing at S154 is not carried out.

At S154, the search result distance calculation unit 160 updates the search result distance Z[i] with the inter-segment distance d.

The search result distance output processing (S160) will be described.

The search result distance output unit 161 outputs the search result distance Z for each of the test segments.

When the test segment has a large search result distance Z, that test segment is not similar to any of the sample segments. In different words, that test segment is not similar to any of the training segments.

Accordingly, when the test segment has a relatively large search result distance Z compared to those of other segments, that test segment can be deemed as a singularity in the test time-series data T.

In the time-series data search method, the sample segment acting as a representative of the segments whose coordinates are included in the sphere having the approximation error ε as the radius has been found out through two phases of the processing, specifically, the initial segment set generation processing (S110) that finds out the sphere having a radius of ε/2 as the initial segment and the sample segment set generation processing (S130) that finds out the sample segment by uniting the initial segments included in the same sphere having a radius of ε/2.

In the W-dimensional space, the sample segment serves as the centroid of a multi-dimensional hypersphere having the approximation error e as the radius and acts as a representative of the training segments representing coordinates included in that sphere. In other words, the inter-segment distance d between the test segment and the sample segment means that a segment distance between the test segment and the training segment falls within a range of d±ε.

Meanwhile, when the inter-segment distance between the test segment and the training segment is calculated without using the sample segment, a large amount of computation is required. For example, in a case where N number of the test segments and N number of the training segments are present, the computation of $N^2$ number of the inter-segment distances is required. For this reason, it is ideal to select the sample segments such that the least number of the sample segments are obtained. In different words, it is certainly ideal to select an optimum sphere having an optimum radius but in order to select an optimum sphere having an optimum radius from the multi-dimensional space, a large amount of computation is required, for example, for the investigation on the density distribution of segments. The selection of the optimum sphere not only means the selection of a sphere in which the least number of the sample segments are finally obtained but also means the selection of a sphere in which the most number of the sample segments included in the sphere are obtained.

The embodiment has given more priority to the reduction of the amount of computation than the selection of the optimum sphere.

*Description of Effects*

The time-series data search device 100 can generate the sample segment as a representative of a set of the training segments included in the sphere exactly having the approximation error ε as the radius. With this, the approximation error ε can be ensured in the similarity search.

Additionally, the time-series data search device 100 generates the initial segment set F solely by scanning the training time-series data S one time from the top, thereby being able to generate the sample segment set E solely by scanning the initial segment set F one time from the top.

Consequently, the sample segment for which the approximation error ε is ensured can be extracted from the training time-series data S at a high speed.

Second Embodiment

A mode using the feature quantity different from the average value will be described. Note that the common description with the first embodiment will be omitted.

*Description of Configuration*

The function configuration of a time-series data search device 100 is same as that in FIG. 1 according to the first embodiment.

*Description of Operation*

Figure 3:
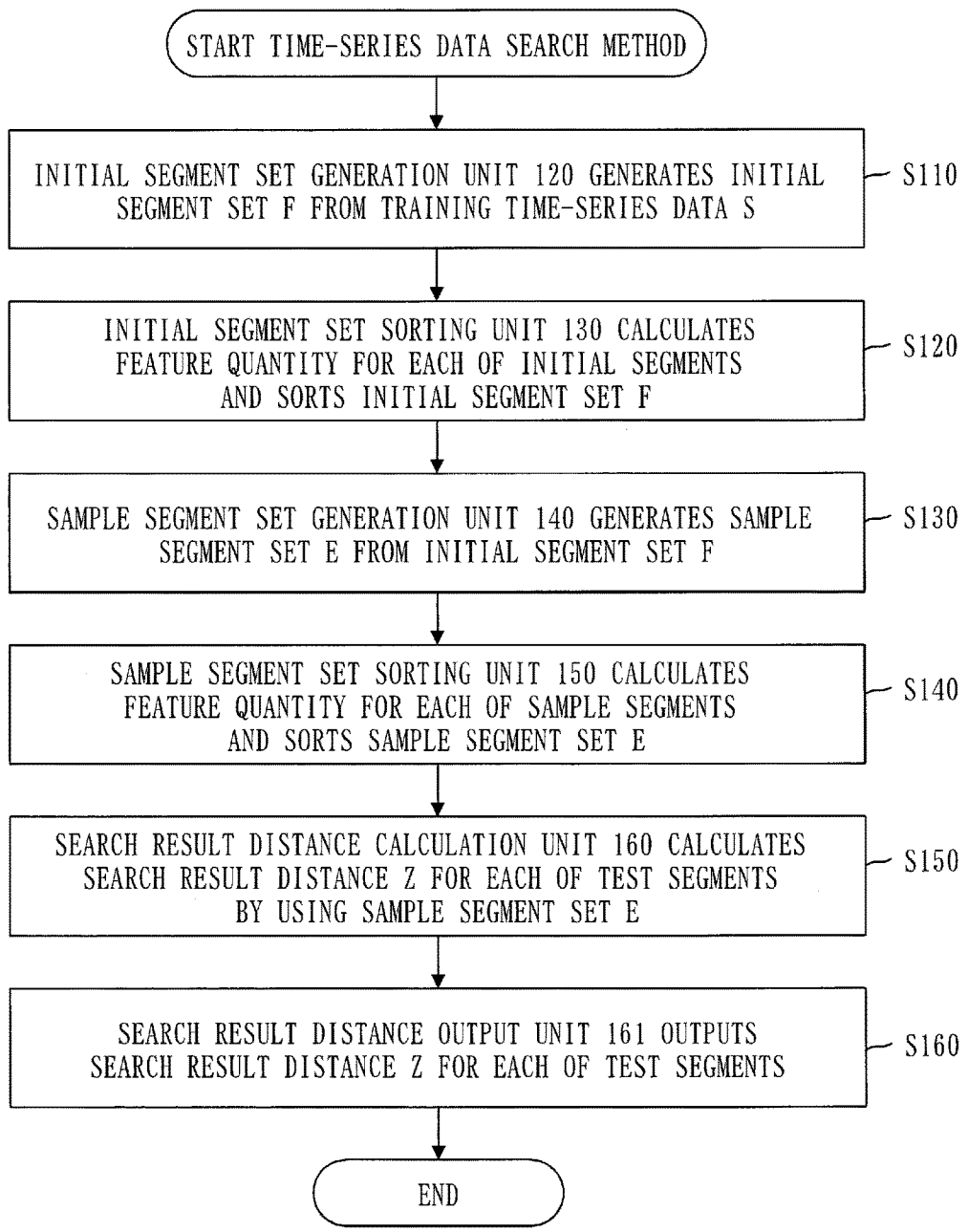
FIG. 3 is a flowchart of a time-series data search method according to the first embodiment.

The flow of processing of a time-series data search method is same as that in FIG. 3 according to the first embodiment.

However, S120 to S140 are different from those of the first embodiment as described below.

At S120, a feature quantity $D(F_i)$ of an initial segment $F_i$ is a distance between a coordinate by a coordinate value represented by the initial segment $F_i$ and a reference point.

The reference point is an origin $0=\{0, 0, \ldots, 0\}$ in the W-dimensional space. In such a case, the initial segment $F_i$ is positioned on a spherical surface having $D(F_i)$ as the radius. Note that the reference point may be coordinates other than the origin 0.

At S130, a feature quantity D(C) of a centroid C is a distance between the centroid C and the reference point.

At S132-1 (refer to FIG. 6), whether the feature quantity difference between the feature quantity $D(F_i)$ and the feature quantity D(C) is more than ε/2 is judged. This conditional expression $|D(F_i)-D(C)|>\varepsilon/2$ is obtained on the basis of following expression <6> and expression <7>.

Expression <6> works as an expression that finds out a minimum value of a distance between first coordinates having a distance of $D_1$ from the reference point and second coordinates having a distance $D_2$ from the reference point in the W-dimensional space.

Accordingly, in order to obtain a distance between the first coordinates and the second coordinates equal to or less than $d_\varepsilon$, expression <7> needs to be satisfied.

[Formula 4]

$$|D_1-D_2| \quad <6>$$

$$|D_1-D_2| \le d_\varepsilon \quad <7>$$

In a case where the reference point is the origin 0, a range of distance between the coordinates of the initial segment $F_i$ and the coordinates of the centroid C can be expressed by following expression <8>.

Expression <8> means that, when a distance between the initial segment $F_i$ and the reference point frequently exceeds $|D(F_i)+D(C)|$ since the initial segments $F_i$ are dispersed, the exploration can be discontinued earlier at S132-1.

[Formula 5]

$$|D(F_i)-D(C)| \le \text{dist}(C,F_i) \le |D(F_i)+D(C)| \quad <8>$$

At S140, a feature quantity $D(E_i)$ of a sample segment $E_i$ is a distance between a coordinate by a coordinate value represented by the sample segment $E_i$ and the reference point.

*Description of Effects*

When the initial segments are dispersed, the time-series data search device 100 discontinues the exploration for generating the sample segment early, thereby being able to generate the sample segment set at a high speed.

Third Embodiment

A mode using the feature quantity different from the average value will be described. Note that the common description with the first embodiment will be omitted.

*Description of Configuration*

The function configuration of a time-series data search device 100 is same as that in FIG. 1 according to the first embodiment.

*Description of Operation*

The flow of processing of a time-series data search method is same as that in FIG. 3 according to the first embodiment.

However, S120 and S140 are different from those of the first embodiment as described below.

At S120, the feature quantity of the initial segment is a partial average value obtained by averaging data values included in an initial partial segment extracted from the initial segment. Specifically, the initial segments included in an initial segment set F are sorted by the order of the partial average value.

The following methods (1) and (2) are considered as a method for extracting the initial partial segment.

(1) A former half $F_{i(f)}[i:(i+W-1)/2]$ of the initial segment $F_i[i:i+W-1]$ or a latter half $F_{i(b)}[(i+W-1)/2:i+W-1]$ thereof is extracted as the initial partial segment.

(2) A first section $F_{i(1)}[i:(i+W-1)/4]$ and a third section $F_{i(3)}[(i+W-1)/2:(i+W-1)*3/4]$ obtained by dividing the initial segment $F_i[i:i+W-1]$ into four equal parts are extracted as the initial partial segment. Alternatively, a second section $F_{i(2)}[(i+W-1)/4:(i+W-1)/2]$ and a fourth section $F_{i(4)}[(i+W-1)*3/4:i+W-1]$ are extracted as the initial partial segment.

At S140, the feature quantity of the sample segment is a partial average value obtained by averaging data values included in a sample partial segment extracted from the sample segment. Specifically, the sample segments included in a sample segment set E are sorted by the order of the partial average values.

A feature quantity $D(F_i)$ of the initial segment and a feature quantity $D(C)$ of the centroid at S130 are same as those in the first embodiment.

Specifically, the feature quantity $D(F_i)$ of the initial segment is a whole average value obtained by averaging data values included in the initial segment, whereas the feature quantity $D(C)$ of the centroid is a centroid average value obtained by averaging data values when a coordinate value of the centroid is treated as W number of data values. In addition, the feature quantity difference between the feature quantity $D(F_i)$ of the initial segment and the centroid feature quantity $D(C)$ is a difference between the whole average value and the centroid average value.

A conditional expression at S132-1 (refer to FIG. 6) is $|D(F_i)-D(C)| > \varepsilon/(2*\sqrt{W})$ as in the first embodiment.

*Description of Effects*

Even in a case where there are a large number of the initial segments having the whole average values close to each other, by sorting the initial segment set by the order of the partial average values, the enlargement of an explore range of the initial segments is suppressed, thereby the sample segment set can be generated at a high speed.

Fourth Embodiment

A mode using the feature quantity different from the average value will be described. Note that the common description with the first embodiment will be omitted.

*Description of Configuration* The function configuration of a time-series data search device 100 is same as that in FIG. 1 according to the first embodiment.

*Description of Operation* The flow of processing of a time-series data search method is same as that in FIG. 3 according to the first embodiment.

However, the content of S120 to S140 is different from that in the first embodiment as described below.

At S120, a feature quantity $D(F_i)$ of an initial segment $F_i$ is the degree of complexity of the initial segment $F_i$. This degree of complexity is calculated from a difference in data values between every two consecutive data values included in the initial segment $F_i$.

The degree of complexity $\text{comp}(F_i)$ of the initial segment $F_i$ is calculated with following expression <9>.

[Formula 6]

$$\text{comp}(F_i) = \sqrt{\sum_{j=0}^{W-2} (F_i[j] - F_i[j+1])^2} \quad <9>$$

At S130, a feature quantity $D(C)$ of a centroid C is the degree of complexity of a centroid segment. This degree of complexity is calculated from a difference in data values between every two consecutive data values included in the centroid segment when a coordinate value of the centroid C is treated as the centroid segment constituted by W number of data values.

A method for calculating the degree of complexity comp (C) of the centroid segment is same as the method for calculating the degree of complexity $\text{comp}(F_i)$ of the initial segment $F_i$ at S120. However, $F_i$ is replaced with C in aforementioned expression <9>.

At S132-1 (refer to FIG. 6), whether the feature quantity difference between the feature quantity $D(F_i)$ and the feature quantity $D(C)$ is more than a is judged. This conditional expression $|D(F_i)-D(C)| > \varepsilon$ is obtained on the basis of following expression <10> and expression <11>.

A Euclidean distance $\text{dist}(E_1,E_2)$ between the coordinates of a first sample segment $E_1$ and the coordinates of a second sample segment $E_2$ satisfies the range of expression <10>.

Accordingly, in order to obtain a distance between the coordinates of the first sample segment $E_1$ and the coordinates of the second sample segment $E_2$ equal to or less than $d_\varepsilon$, expression <11> needs to be satisfied.

[Formula 7]

$$\frac{|comp(E_1) - comp(E_2)|}{2} \leq dist(E_1, E_2) \quad <10>$$

$$\frac{|comp(E_1) - comp(E_2)|}{2} \leq d_\varepsilon \quad <11>$$

At S140, a feature quantity $D(E_i)$ of a sample segment $E_i$ is the degree of complexity of the sample segment $E_i$.

A method for calculating the degree of complexity $comp(E_i)$ of the sample segment $E_i$ is same as the method for calculating the degree of complexity $comp(F_i)$ of the initial segment $F_i$ at S120. However, $F_i$ is replaced with $E_i$ in aforementioned expression <9>.

\*\*\*Description of Effects\*\*\* As in the first embodiment, the sample segment for which the approximation error ε is ensured can be extracted from training time-series data S at a high speed.

Fifth Embodiment

A mode using the feature quantity different from the average value will be described. Note that the common description with the first embodiment will be omitted.

\*\*\*Description of Configuration\*\*\*

The function configuration of a time-series data search device 100 is same as that in FIG. 1 according to the first embodiment.

\*\*\*Description of Operation\*\*\*

The flow of processing of a time-series data search method is same as that in FIG. 3 according to the first embodiment.

However, S120 to S140 are different from those of the first embodiment as described below.

At S120, the feature quantity of the initial segment is an initial shortest distance. Specifically, the initial segments included in an initial segment set F are sorted by the order of the initial shortest distances.

The initial shortest distance is a shortest distance between a reference plane for the initial segment and an origin O in the W-dimensional space.

The reference plane for the initial segment is a plane expressed by expression <3> in the first embodiment.

An initial shortest distance $\text{Feat}_M(F_i)$ of an initial segment $F_i$ is calculated with following expression <12>.

[Formula 8]

$$\text{Feat}_M(F_i) = \frac{\text{Mean}(F_i)}{\sqrt{W}} = 1 \Big/ W^{\frac{3}{2}} \times \sum_{j=0}^{W-1} F_i[j] \quad <12>$$

At S130, a feature quantity $D(F_i)$ of the initial segment $F_i$ is the initial shortest distance and an initial indicator value. The initial indicator value is a value calculated from a difference between a coordinate value of the initial segment on each of the coordinate axes and a coordinate value of the reference plane for the initial segment on each of the coordinate axes.

An initial indicator value $\text{Feat}_R(F_i)$ of the initial segment $F_i$ is calculated with following expression <13>.

[Formula 9]

$$\text{Feat}_R(F_i) = \sqrt{\sum_{j=0}^{W-1} (F_i[j] - \text{Mean}(F_i))^2} \quad <13>$$

The initial shortest distance is a distance from the origin until a foot of a perpendicular line going down from the origin to the reference plane for the initial segment in the W-dimensional space. The initial indicator value is a distance from a foot of a perpendicular line going down from the origin to the reference plane for the initial segment until a coordinate value represented by the initial segment in the W-dimensional space. Intuitively, the initial indicator value represents a shift of the coordinate value represented by the initial segment on the reference plane.

Meanwhile, a feature quantity $D(C)$ of a centroid C is a centroid shortest distance and a centroid indicator value.

The centroid shortest distance is a shortest distance between the origin O and a reference plane for the centroid in the W-dimensional space. The reference plane for the centroid is a plane expressed by expression <3> in the first embodiment. However, $F_n$ is replaced with C in expression <3>. A centroid shortest distance $\text{Feat}_M(C)$ of the centroid C is calculated with aforementioned expression <12>. However, $F_i$ is replaced with C in expression <12>.

The centroid indicator value is a value calculated from a difference between a coordinate value of the centroid on each of the coordinate axes and a coordinate value of the reference plane for the centroid on each of the coordinate axes. A centroid indicator value $\text{Feat}_R(C)$ of the centroid C is calculated with aforementioned expression <13>. However, $F_i$ is replaced with C in expression <13>.

At S132-1 (refer to FIG. 6), whether the feature quantity difference between the feature quantity $D(F_i)$ and the feature quantity $D(C)$ is more than ε/2 is judged. This feature quantity difference is a sum of a difference between the initial shortest distance and the centroid shortest distance and a difference between the initial indicator value and the centroid indicator value.

A conditional expression $|D(F_i) - D(C)| > \varepsilon/2$ at S132-1 is obtained on the basis of following expression <14> and expression <15>.

A Euclidean distance $dist(E_1, E_2)$ between the coordinates of a first sample segment $E_1$ and the coordinates of a second sample segment $E_2$ satisfies the range of expression <14>.

Accordingly, in order to obtain a distance between the coordinates of the first sample segment $E_1$ and the coordinates of the second sample segment $E_2$ equal to or less than $d_\varepsilon$, expression <15> needs to be satisfied.

[Formula 10]

$$\sqrt{(\text{Feat}_M(E_1) - \text{Feat}_M(E_2))^2 + (\text{Feat}_R(E_1) - \text{Feat}_R(E_2))^2} \leq \quad <14>$$

$$dist(E_1, E_2) \leq$$

$$\sqrt{(\text{Feat}_M(E_1) - \text{Feat}_M(E_2))^2 + (\text{Feat}_R(E_1) + \text{Feat}_R(E_2))^2}$$

$$\sqrt{(\text{Feat}_M(E_1) - \text{Feat}_M(E_2))^2 + (\text{Feat}_R(E_1) - \text{Feat}_R(E_2))^2} \leq \varepsilon \quad <15>$$

At S140, the feature quantity of the sample segment is a sample shortest distance. Specifically, the sample segments included in a sample segment set E are sorted by the order of the sample shortest distances.

The sample shortest distance is a shortest distance between a coordinate by a coordinate value represented by the sample segment and the reference plane for the initial segment. A reference plane for the sample segment is a plane expressed by expression <3> in the first embodiment. However, $F_n$ is replaced with $E_n$ in expression <3>. A sample shortest distance $\text{Feat}_M(E_i)$ of a sample segment $E_i$ is calculated with aforementioned expression <12>. However, $F_i$ is replaced with $E_i$ in expression <12>.

Note that, when described in different words, the judgment method using the average value, which has been described in the first embodiment, can be regarded as judgment based on a distance between two planes. Specifically, $|D(F_i)-D(C)|$ can be replaced with following expression <16> in the first embodiment.

[Formula 11]

$$|\text{Feat}_M(E_j) - \text{Feat}_M(E_i)| \qquad <16>$$

*Description of Effects* By considering a shift off a point taking the shortest distance between two planes, the distance can be strictly judged. Additionally, the sample segment can be extracted at a high speed by discontinuing the exploration for the initial segment early.

Sixth Embodiment

A mode that selects the type of the feature quantity in accordance with a condition will be described. Note that the common description with the first embodiment to the fifth embodiment will be omitted.

<First Working Example>
*Description of Configuration*

The function configuration of a time-series data search device 100 is same as that in FIG. 1 according to the first embodiment.

However, the type of the feature quantity of the initial segment differs between a case where solely one of a positive data value and a negative data value is included in training time-series data S and a case where both of a positive data value and a negative data value are included in the training time-series data S.

*Description of Operation*

The flow of processing of a time-series data search method is same as that in FIG. 3 according to the first embodiment.

However, S120 to S140 are different from those of the first embodiment as described below.

At S120, an initial segment set sorting unit 130 calculates the feature quantities of the types described in the respective first to fifth embodiments.

In addition, the initial segment set sorting unit 130 judges whether both of the positive and negative data values are included in the training time-series data S. This judgement is carried out simultaneously with the calculation of the feature quantities and thus, overheads in the judgment can be reduced.

When both of the positive and negative data values are included in the training time-series data S, the initial segment set sorting unit 130 selects the feature quantity of the type described in the first embodiment, the third embodiment, the fourth embodiment, or the fifth embodiment.

When one of the positive and negative data values are included in the training time-series data S, the initial segment set sorting unit 130 selects the feature quantity of the type described in the second embodiment or the fourth embodiment.

Subsequently, the initial segment set sorting unit 130 sorts the initial segments included in an initial segment set F by the order of the selected feature quantities.

S130 and S140 are same as those in the embodiment that has described the feature quantity of the selected type.

<Second Working Example>
*Description of Configuration*

The function configuration of a time-series data search device 100 is same as that in FIG. 1 according to the first embodiment.

However, the type of the feature quantity of the initial segment differs between a case where a variance value calculated from an indicator value for each of the training segments falls within a variance value range serving as a condition for the variance value and a case where the variance value does not fall within the variance value range.

The indicator value of the training segment is a value calculated from a difference between a coordinate value of the training segment on each of the coordinate axes and a coordinate value of a reference plane for the training segment on each of the coordinate axes.

*Description of Operation*

The flow of processing of a time-series data search method is same as that in FIG. 3 according to the first embodiment.

However, S120 to S140 are different from those of the first embodiment as described below.

At S120, an initial segment set sorting unit 130 calculates the feature quantities of the types described in the respective first to fifth embodiments.

In addition, the initial segment set sorting unit 130 calculates $\text{Feat}_R(S_i)$ with respect to each of training segments $S_i$ as the feature quantity. This feature quantity is the indicator value described in the fifth embodiment.

Furthermore, the initial segment set sorting unit 130 calculates the variance value of the feature quantity for each of the training segments and then judges whether the variance value falls within the variance value range by using a threshold.

When the variance value is equal to or less than the threshold, the initial segment set sorting unit 130 selects the feature quantity of the type described in the first embodiment, the third embodiment, or the fourth embodiment.

When the variance value is more than the threshold, the initial segment set sorting unit 130 selects the feature quantity of the type described in the second embodiment, the fourth embodiment, or the fifth embodiment.

Subsequently, the initial segment set sorting unit 130 sorts the initial segments included in an initial segment set F by the order of the selected feature quantities.

S130 and S140 are same as those in the embodiment that has described the feature quantity of the selected type.

This second working example is a method using $\text{Feat}_R(E_i)$ described in the fifth embodiment.

Segments of the time-series data in which a change in data values is moderate are thought to be distributed around the fundamental vector in the W-dimensional space due to the third characteristic of the time-series data. The fundamental vector V is a vector passing through an origin 0 and a point $(1, 1, \ldots, 1)$. This $\text{Feat}_R(E_i)$ serves as an indicator representing a shift between a sample vector $E_1$ represented by a sample segment $E_i$ and the fundamental vector V. Consequently, the second working example is deduced.

<Third Working Example>
*Description of Configuration*

The function configuration of a time-series data search device 100 is same as that in FIG. 1 according to the first embodiment.

However, the type of the feature quantity of the initial segment differs between a case where a maximum value calculated from an indicator value for each of the training segments falls within a maximum value range serving as a condition for the maximum value and a case where the maximum value does not fall within the maximum value range.

The indicator value of the training segment is a value calculated from a difference between a coordinate value of the training segment on each of the coordinate axes and a coordinate value of the reference plane for the training segment on each of the coordinate axes.

*Description of Operation*

The flow of processing of a time-series data search method is same as that in FIG. 3 according to the first embodiment.

However, S120 to S140 are processing corresponding to S120 to S140 in <Second Working Example> where the variance value is replaced with the maximum value.

<Fourth Working Example>
*Description of Configuration*

The function configuration of a time-series data search device 100 is same as that in FIG. 1 according to the first embodiment.

However, the type of the feature quantity of the initial segment differs between a case where a variance value calculated from an indicator value for each of the training segments falls within a variance value range serving as a condition for the variance value and a case where the variance value does not fall within the variance value range.

The indicator value of the training segment is a value indicating a size of an argument of a vector representing a coordinate value of the training segment.

*Description of Operation*

The flow of processing of a time-series data search method is same as that in FIG. 3 according to the first embodiment.

However, S120 to S140 are different from those of the first embodiment as described below.

At S120, an initial segment set sorting unit 130 calculates the feature quantities of the types described in the respective first to fifth embodiments.

In addition, the initial segment set sorting unit 130 calculates an argument $\varphi$ with respect to each of training segments $S_i$ as the feature quantity. The argument $\varphi$ is a value found out from an inner product of a training vector $S_i$ and a fundamental vector V. The training vector $S_i$ is a vector passing through an origin 0 and the coordinates of the training segment $S_i$.

The argument $\varphi$ is calculated with following expression <17> and expression <18>. Signs representing vectors are noted with arrows on upper sides thereof.

[Formula 12]

$$\vec{S_i} \cdot \vec{V} = |\vec{S_i}||\vec{V}|\cos\varphi = |\vec{S_i}|\cos\varphi \qquad <17>$$

$$\varphi = \cos^{-1}\frac{\vec{S_i} \cdot \vec{V}}{|\vec{S_i}|}. \qquad <18>$$

Furthermore, the initial segment set sorting unit 130 calculates the variance value of the feature quantity for each of the training segments and then judges whether the variance value falls within the variance value range by using a threshold.

When the variance value is equal to or less than the threshold, the initial segment set sorting unit 130 selects the feature quantity of the type described in the first embodiment, the third embodiment, or the fourth embodiment.

When the variance value is more than the threshold, the initial segment set sorting unit 130 selects the feature quantity of the type described in the second embodiment, the fourth embodiment, or the fifth embodiment.

Subsequently, the initial segment set sorting unit 130 sorts the initial segments included in an initial segment set F by the order of the selected feature quantities.

S130 and S140 are same as those in the embodiment that has described the feature quantity of the selected type.

<Fifth Working Example>
*Description of Configuration*

The function configuration of a time-series data search device 100 is same as that in FIG. 1 according to the first embodiment.

However, the type of the feature quantity of the initial segment differs between a case where a maximum value calculated from an indicator value for each of the training segments falls within a maximum value range serving as a condition for the maximum value and a case where the maximum value does not fall within the maximum value range.

The indicator value of the training segment is a value indicating a size of an argument of a vector representing a coordinate value of the training segment.

*Description of Operation*

The flow of processing of a time-series data search method is same as that in FIG. 3 according to the first embodiment.

However, S120 to S140 are processing corresponding to S120 to S140 in <Fourth Working Example> where the variance value is replaced with the maximum value.

*Description of Effects*

The first embodiment to the fourth embodiment have used one feature quantity in the distance judgment for the initial segment, while the fifth embodiment has used two feature quantities. Typically, when a larger number of the feature quantities are used, more precise judgement is enabled but on the other hand, the amount of computation increases.

For a solution to this, the sixth embodiment uses two feature quantities in a case where the amount of decrease in the explore range owing to the precise judgement is thought to be larger than the amount of increase in the amount of computation.

Specifically, the sixth embodiment selects the feature quantity depending on the characteristic of the time-series data, thereby being able to efficiently explore for the initial segment to generate the sample segment.

Seventh Embodiment

Figure 9:
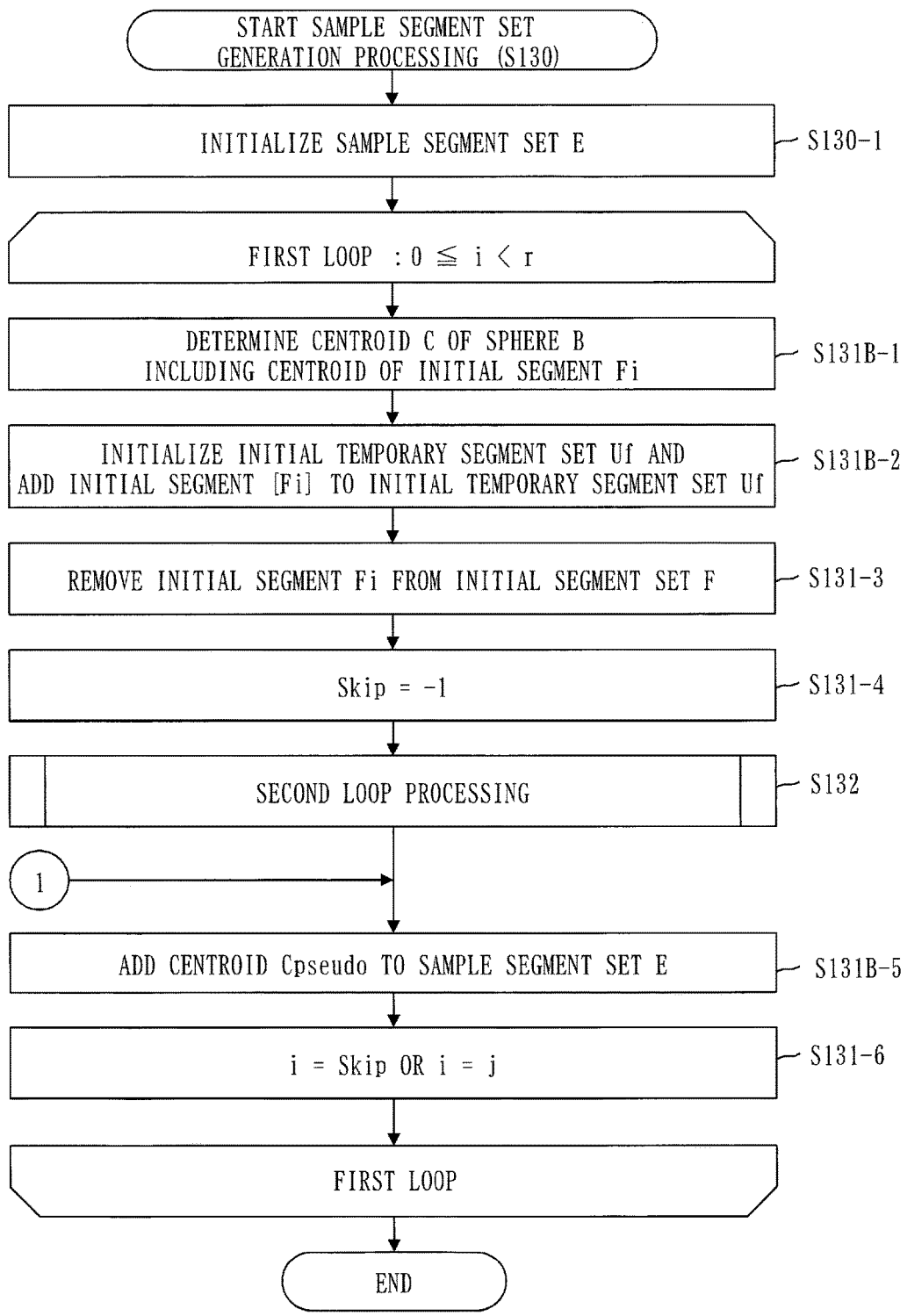
FIG. 9 is a flowchart of sample segment set generation processing (S130) according to the seventh embodiment.
Figure 10:
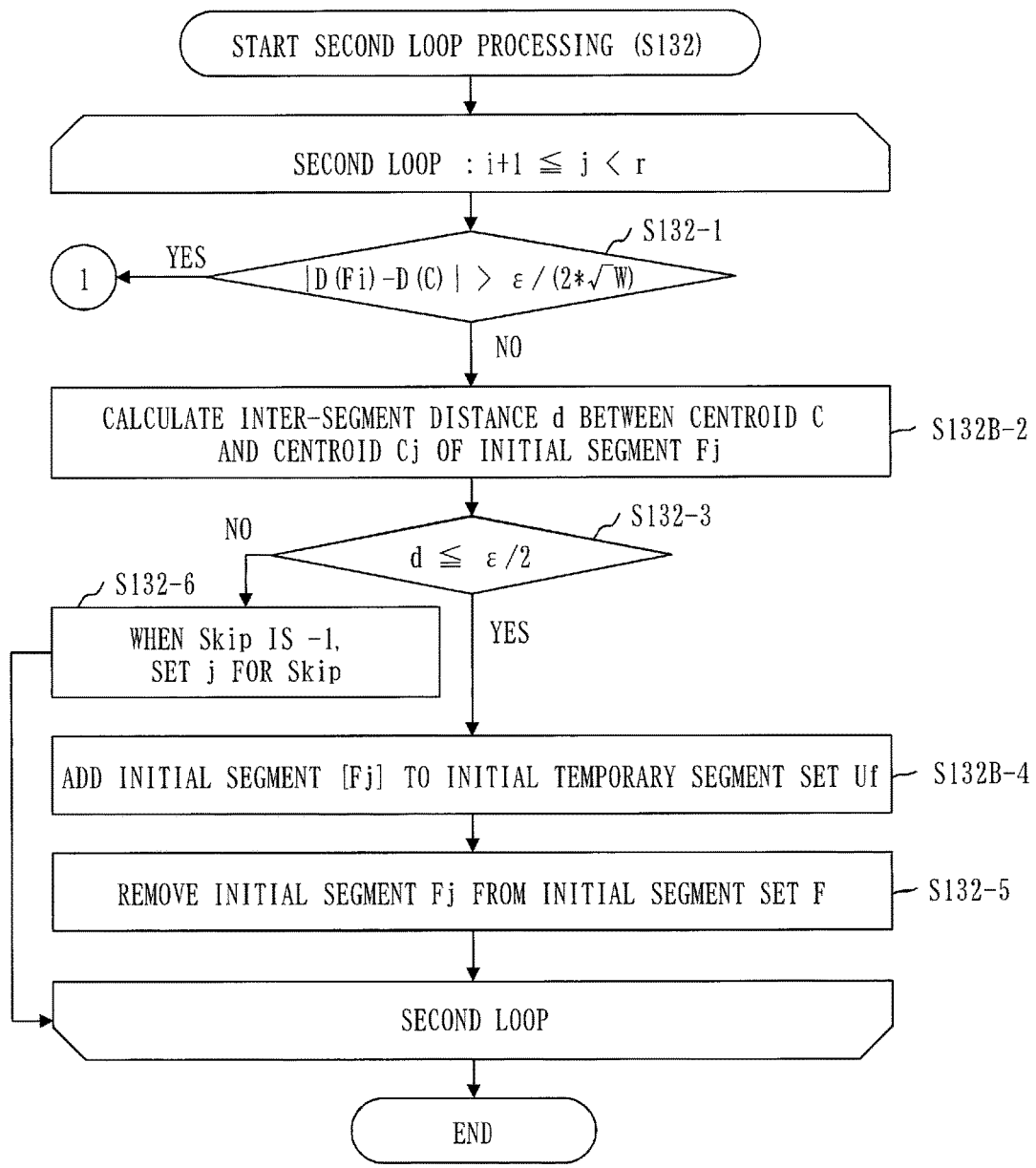
FIG. 10 is a flowchart of second loop processing (S132) in the sample segment set generation processing (S130) according to the seventh embodiment.

A mode that selects the sample segment from the initial segments included in an initial temporary segment set $U_f$ will be described on the basis of FIG. 8 to FIG. 10. Note that the common description with the first embodiment will be omitted.

*Description of Configuration*

The function configuration of a time-series data search device 100 is same as that in FIG. 1 according to the first embodiment.

However, an initial segment set generation unit 120 functions as described below.

The initial segment set generation unit 120 generates the plurality of training segments each obtained by extracting W number of data values from training time-series data S in the order of the time series and then generates a plurality of training temporary segment sets each indicating one or more training segments arranged in the order of the time series.

Subsequently, the initial segment set generation unit 120 generates an initial segment set F indicating the training temporary segment set as the initial segment with respect to each of the training temporary segment sets.

In a case where the training temporary segment set includes the plurality of training segments, distances between a top training segment in the order of the time series among the plurality of training segments and the rest of the training segments are equal to or less than a condition radius $\varepsilon/2$.

Meanwhile, a sample segment set generation unit 140 functions as described below.

The sample segment set generation unit 140 divides the initial segment set F into one or more initial temporary segment sets. The initial temporary segment set is made up of the initial segment constituted by data values representing a coordinate value included in a figure with respect to each of W-dimensional figures (spheres B) having the condition radius $\varepsilon/2$ serving as a condition for the radius. Subsequently, on the basis of a coordinate value of a centroid of the figure by the initial temporary segment set, the sample segment set generation unit 140 selects the training segment from the initial temporary segment set as the sample segment and then generates a sample segment set E indicating the sample segment for each of the initial temporary segment sets.

*Description of Operation*

The flow of processing of a time-series data search method is same as that in FIG. 3 according to the first embodiment.

However, S110 to S130 are different from those of the first embodiment as described below.

The initial segment set generation processing (S110) will be described on the basis of FIG. 8. A sign B will be added to a step number for processing different from that of the first embodiment.

At S111, the initial segment set generation unit 120 initializes the initial segment set F.

At S112B, the initial segment set generation unit 120 initializes a training temporary segment set Us and then adds, instead of an actual training segment $S_i$, an index i identifying the training segment $S_i$ to the training temporary segment set $U_s$. The index i is a value of a variable i. It is clear that, when the training segment $S_i$ is required hereinafter, the training segment $S_i$ can be restored through the index i and the training time-series data.

At S113, the initial segment set generation unit 120 calculates an inter-segment distance d between the training segment $S_i$ and a training segment $S_j$.

At S114, the initial segment set generation unit 120 judges whether the inter-segment distance d is no more than $\varepsilon/2$.

At S115B, the initial segment set generation unit 120 adds an index j to the training temporary segment set $U_s$. The index j is a value of a variable j.

At S116B, the initial segment set generation unit 120 adds the training temporary segment set $U_s$ to the initial segment set F.

At S117, the initial segment set generation unit 120 updates the value of the variable i to the value of the variable j.

Figure 8:
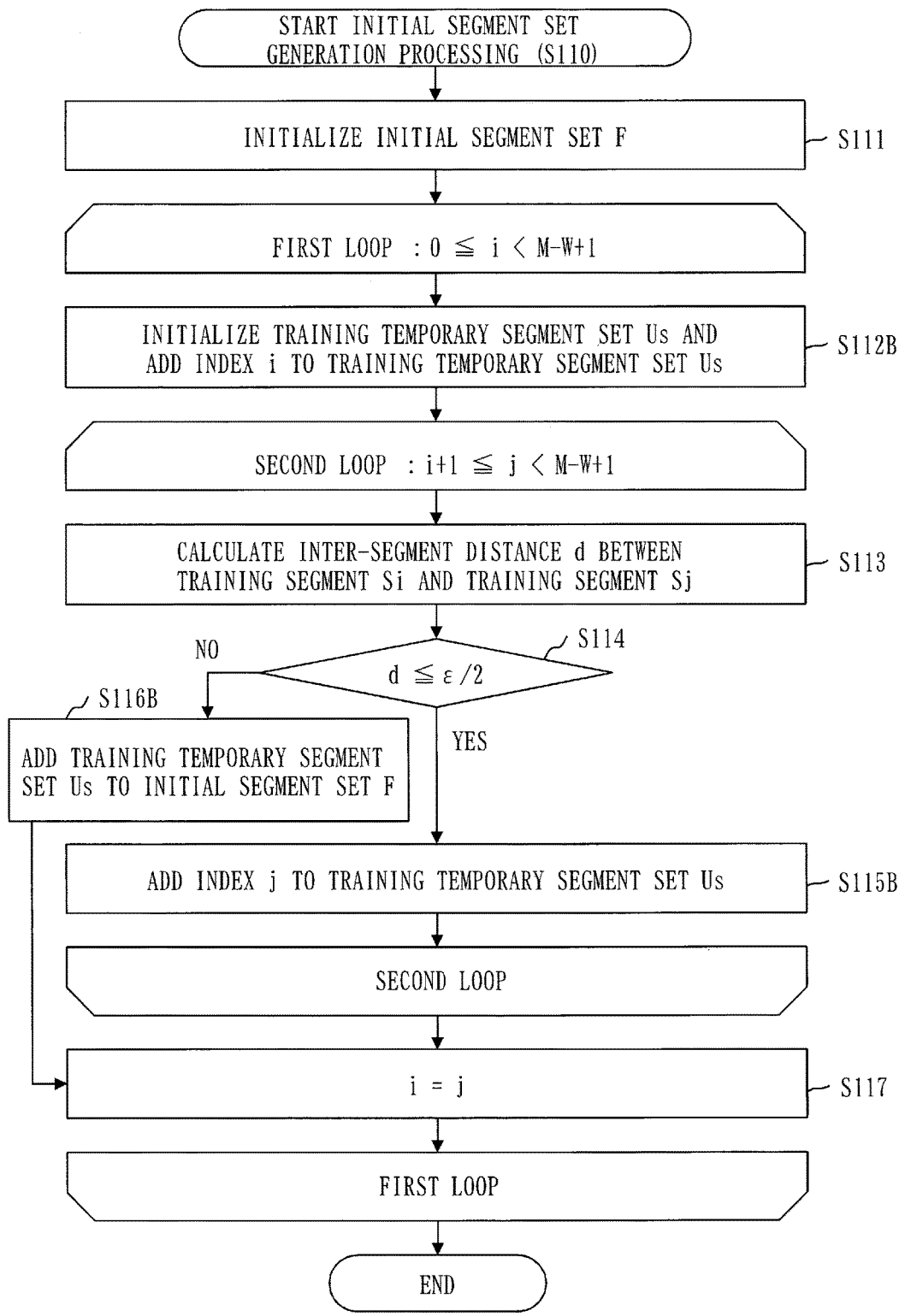
FIG. 8 is a flowchart of initial segment set generation processing (S110) according to a seventh embodiment.

The initial segment set F constituted by the index of the initial segment can be generated through the processing in FIG. 8. In the initial segment set F, the initial segment is identified by way of the index.

At S120, with respect to each of the initial segments included in the initial segment set F, an initial segment set sorting unit 130 calculates the centroid of coordinates represented by the respective training segments identified by way of the indexes included in the initial segment.

The initial segment set sorting unit 130 calculates the feature quantity of the centroid with respect to each of the initial segments. After the feature quantity is calculated with respect to each of the initial segments, the centroid for each of the initial segments is discarded from the memory.

Subsequently, the initial segment set sorting unit 130 sorts the initial segments included in the initial segment set F by the ascending order of the feature quantities.

The sample segment set generation processing (S130) will be described on the basis of FIG. 9. A sign B will be added to a step number for processing different from that of the first embodiment.

At S130-1, the sample segment set generation unit 140 initializes the sample segment set E.

At S131B-1, the sample segment set generation unit 140 determines a centroid C of a sphere B including the centroid of an initial segment $F_i$. The radius of the sphere B is $\varepsilon/2$.

At S131B-2, the sample segment set generation unit 140 initializes an initial temporary segment set $U_f$ and then adds an initial segment $[F_i]$ to the initial temporary segment set $U_f$.

The initial segment $[F_i]$ means the training segment identified by the index included in the initial segment $F_i$.

At S131-3, the sample segment set generation unit 140 removes the initial segment $F_i$ from the initial segment set $F_i$.

At S131-4, the sample segment set generation unit 140 sets –1 for a variable Skip.

At S131B-5, the sample segment set generation unit 140 calculates a centroid $C_{true}$ of the initial temporary segment set $U_f$. $C_{true}$ can be calculated by calling the training segment included in $U_f$ by way of the index and carrying out the computation similarly to expression <1>.

The sample segment set generation unit 140 calculates a distance σ between the coordinates of the training segment and the coordinates of the centroid $C_{true}$ with respect to each of the training segments included in the initial temporary segment set $U_f$.

Subsequently, the sample segment set generation unit 140 adds the index of the training segment having a least distance a to the sample segment set E as a centroid $C_{pseudo}$ of the sample segment.

Because the training segment eventually works as the sample segment, it is only required to store the index of the training segment instead of a W-dimensional vector.

In addition, by storing the distance a between the centroid $C_{true}$ and the sample segment, it is possible to indicate that an error in distance finally falls within ε+σ.

The second loop processing (S132) of the sample segment set generation processing (S130) will be described on the basis of FIG. 10. A sign B will be added to a step number for processing different from that of the first embodiment.

At S132-1, the sample segment set generation unit 140 judges whether the feature quantity difference between a feature quantity $D(F_j)$ of an initial segment $F_j$ and a feature quantity $D(C)$ of the centroid C is more than $\varepsilon/(2*\sqrt{W})$.

At S132B-2, the sample segment set generation unit 140 calculates a centroid $C_j$ of the initial segment $F_j$.

Subsequently, the sample segment set generation unit 140 calculates the inter-segment distance d serving as a distance between the coordinates of the centroid C and the coordinates of the centroid Cj.

At S132-3, the sample segment set generation unit 140 judges whether the inter-segment distance d is no more than $\varepsilon/2$.

At S132B-4, the sample segment set generation unit 140 adds the initial segment [$F_j$] to the initial temporary segment set $U_j$.

At S132-5, the sample segment set generation unit 140 removes the initial segment $F_j$ from the initial segment set F.

At S132-6, when the variable Skip is a negative value (−1), the sample segment set generation unit 140 sets the value of the variable j for the variable Skip.

By using the index of the training segment eventually working as the sample segment instead of a W-dimensional segment, a storage capacity required to store the sample segment can be reduced to approximately 1/W. That is to say, the storage efficiency can be enhanced.

* Supplementary Description*

The supplementary description regarding the sample segment will be given on the basis of FIG. 11 to FIG. 16.

Figure 11:
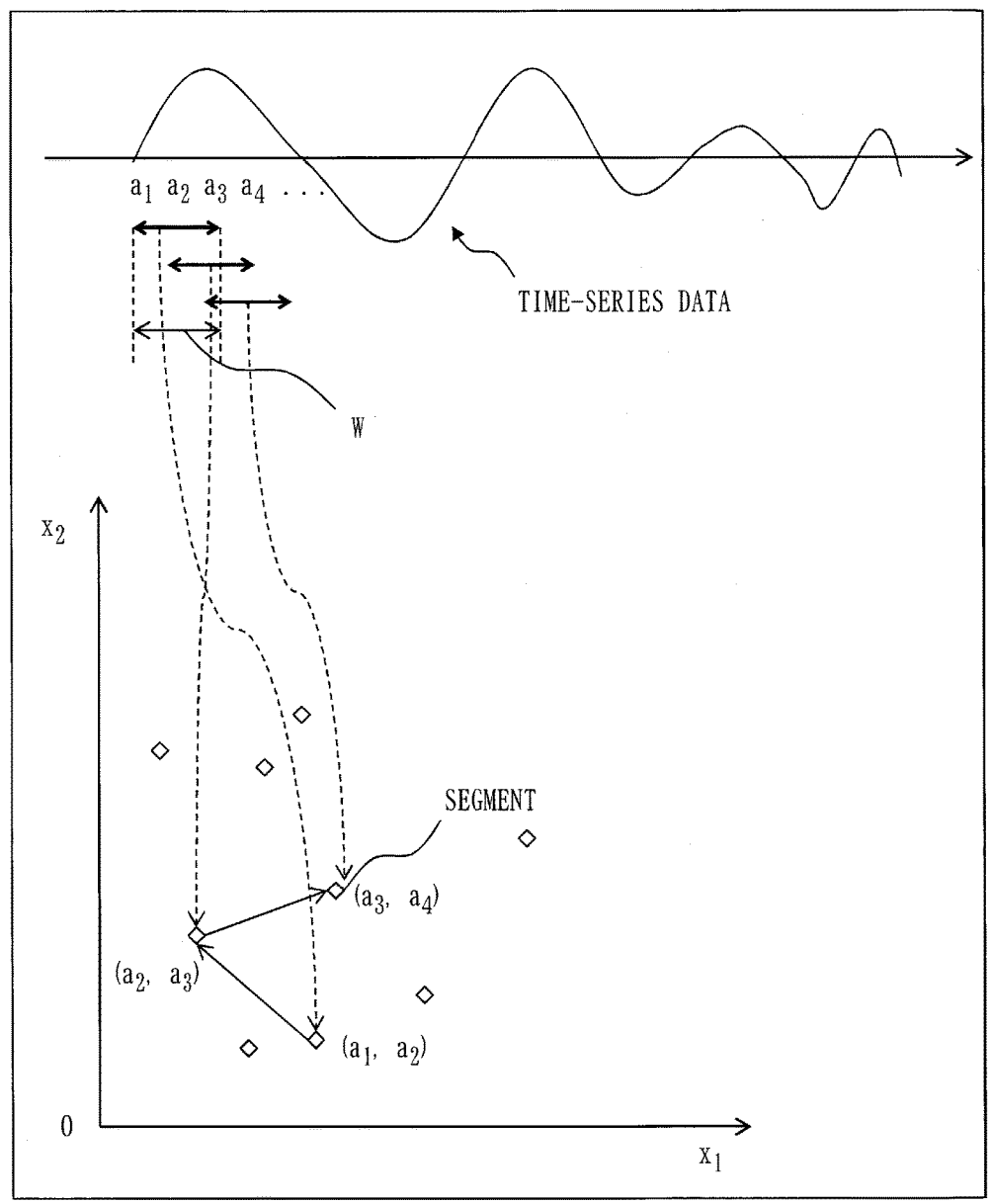
FIG. 11 is a conceptual diagram regarding a sample segment according to respective embodiments.

In FIG. 11, a segment having a length of W, which has been extracted from the time-series data, corresponds to coordinates in the W-dimensional space. W in FIG. 11 is assumed as two.

Figure 12:
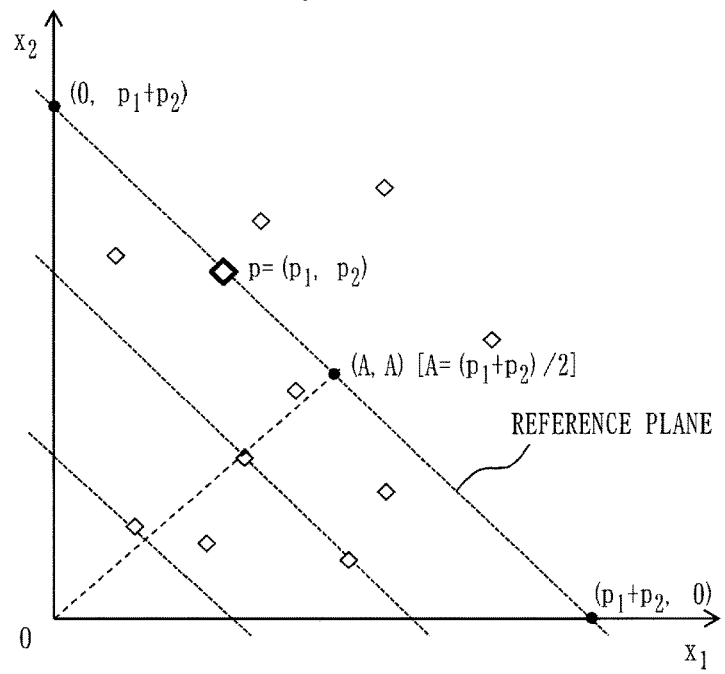
FIG. 12 is a conceptual diagram regarding the sample segment according to the respective embodiments.

In FIG. 12, when an average value A of coordinates in the W-dimensional space is used, it can be said that these coordinates are positioned on a reference plane expressed as $x_1+x_2+\ldots+x_W=A*W$. In the case of W=2, the reference plane applies to a straight line.

Figure 13:
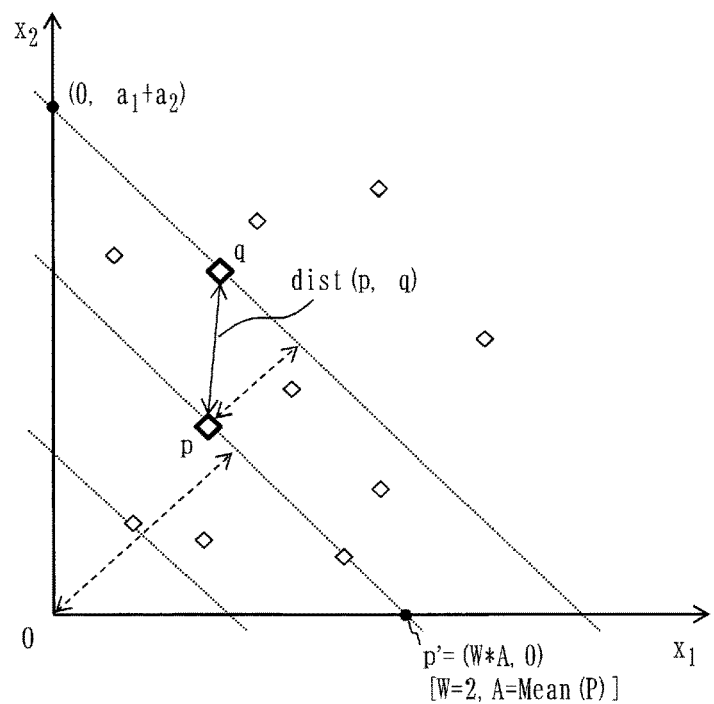
FIG. 13 is a conceptual diagram regarding the sample segment according to the respective embodiments.

In FIG. 13, a distance of a point p' at the intersection of the reference plane of a coordinate p with an $x_1$ axis is $W*A$. A distance from the origin O to the reference plane of the coordinates p is $A*\sqrt{W}$. This means that, when A has a larger value, the coordinates are positioned on a plane farther from the origin O.

Because a distance (dist(p,q)) between the coordinates p and coordinates q is equal to or more than a distance between the reference plane of the coordinates p and the reference plane of the coordinates q, $\text{dist}(p,q) \geq |\text{Mean}(p)*\sqrt{W}-\text{Mean}(q)*\sqrt{W}|$ holds.

Accordingly, in order to obtain $\text{dist}(p,q)\leq \varepsilon/2$, $|\text{Mean}(p)*\sqrt{W}-\text{Mean}(q)*\sqrt{W}| \leq \varepsilon/2$, that is, $|\text{Mean}(p)-\text{Mean}(q)|\leq \varepsilon/(2*\sqrt{W})$ needs to be satisfied.

Figure 14:
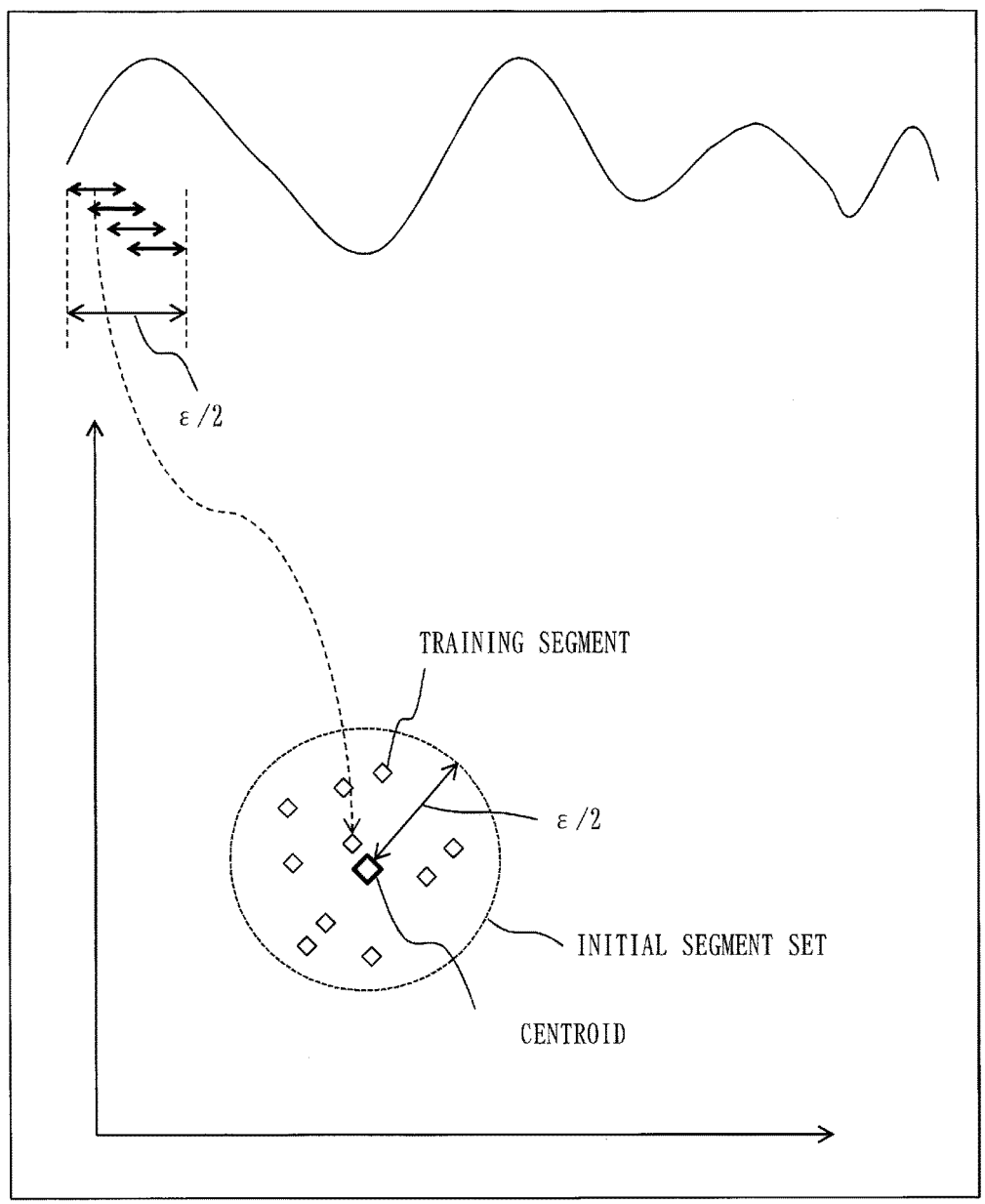
FIG. 14 is a conceptual diagram regarding the sample segment according to the respective embodiments.

In FIG. 14, the initial segment set is included in a sphere having a radius of $\varepsilon/2$. The initial segment set is a set of the training segments each having a distance from the top training segment equal to or less than $\varepsilon/2$.

Figure 15:
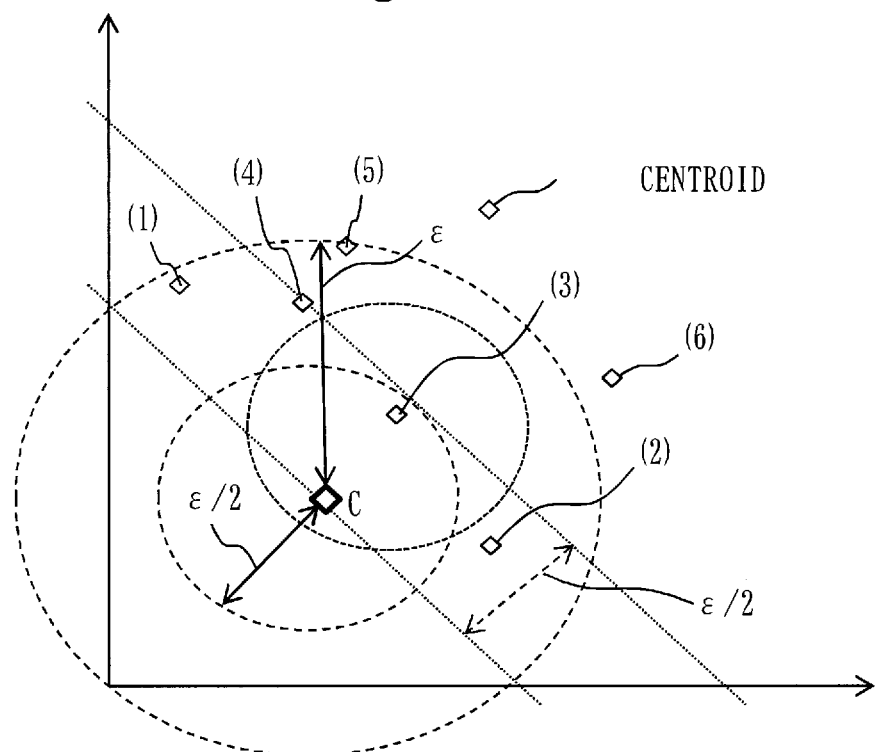
FIG. 15 is a conceptual diagram regarding the sample segment according to the respective embodiments.

In FIG. 15, when the centroids are collected from the initial segment set included in a sphere having the centroid C as the center and a radius of $\varepsilon/2$, all of the collected training segments are included in a sphere having C as the center and a radius of $\varepsilon$.

Accordingly, when a distance between a certain test segment and the centroid C is d, a distance between that test segment and the training segment within a sphere having the centroid C as the center falls within a range of d±$\varepsilon$.

Each of (1) to (6) in FIG. 15 represents the centroid and the distance is investigated for the centroids (1), (2), and (3) in this order, which have average values closer to the average value of C in this order. Thereafter, the centroids up to (4) having differences in the average values relative to C within $\varepsilon/2$ are treated as candidates of objects to be merged as the sample segment. In contrast to this, the centroid (5) having a difference in the average values relative to C more than $\varepsilon/2$ is not treated as the object to be merged. Besides, because the threshold is exceeded at the centroid (5), the investigation on the centroid (6) and its following ones is not required.

Figure 16:
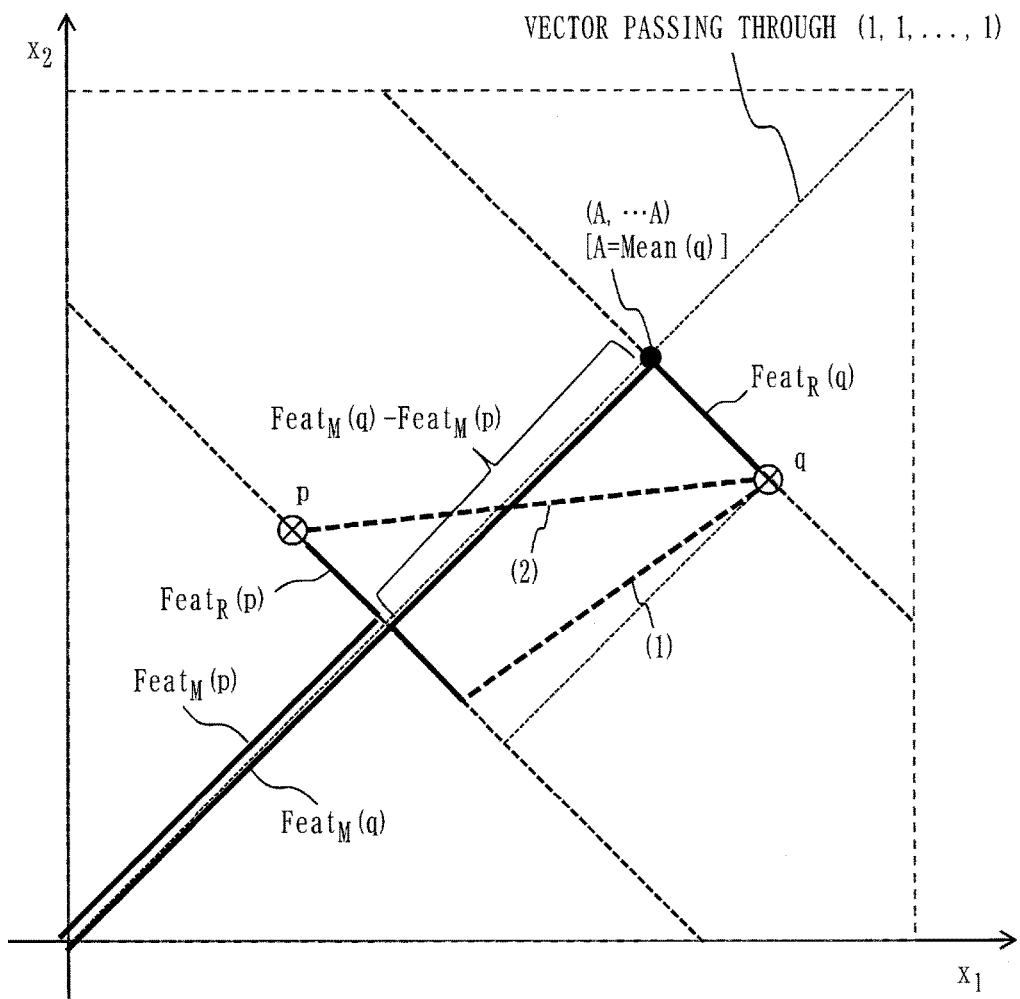
FIG. 16 is a conceptual diagram regarding the sample segment according to the respective embodiments.

In FIG. 16, $\text{Feat}_M$ corresponds to a distance from the origin of the coordinate system to the reference plane. $\text{Feat}_R$ corresponds to a width of shift from a foot of a perpendicular line (A, . . . , A) to the actual centroid. The foot of the perpendicular line represents an endpoint of a perpendicular line going down from the origin to the reference plane.

dist(p,q) is longer than a distance denoted by (1) in FIG. 16. This applies to a former half of expression <14>. In addition, dist(p,q) is shorter than a distance denoted by (2) in FIG. 16. This applies to a latter half of expression <14>.

The respective embodiments merely serve as examples of preferred modes and are not construed to intend the restriction of the technical scope of the invention. Each of the embodiments may be partially carried out, or alternatively, may be carried out by being combined with another embodiment.

The processing procedures described by using the flowcharts and so on are examples of processing procedures by the time-series data search device, the time-series data search method, and a time-series data search program.

REFERENCE SIGNS LIST

100: time-series data search device, 110: time-series data acquisition unit, 111: parameter acquisition unit, 120: initial segment set generation unit, 130: initial segment set sorting unit, 140: sample segment set generation unit, 150: sample segment set sorting unit, 160: search result distance calculation unit, 161: search result distance output unit, 190: data storage unit, 901: processor, 902: auxiliary storage device, 903: memory, 904: communication device, 9041: receiver, 9042: transmitter, 905: input interface, 906: display interface, 907: input device, 908: display, 910: signal line, 911: cable, 912: cable, S: training time-series data, T: test time-series data, W: sliding width, $\varepsilon$: approximation error, F: initial segment set, E: sample segment set, and Z: search result distance

The invention claimed is:

1. A time-series data search device comprising:
processing circuitry to detect an abnormality in an appliance by comparing segments of test time-series data, which is obtained by a sensor installed at the appliance, to a set of training segments of time-series data, wherein the processing circuitry generates the set of training segments through a process comprising:

generating a plurality of training segments each obtained by extracting W number of data values in the order of the time series from training time-series data constituted by a plurality of data values arranged along the time series, generating a plurality of training temporary segment sets each constituted by one or more training segments arranged in the order of the time series, calculating, as an initial segment, W number of data values representing a coordinate value of a centroid of the training temporary segment set with respect to each of the training temporary segment sets when W number of data values included in each of the training segments in the training temporary segment set are treated as a coordinate value in a W-dimensional coordinate system, and generating an initial segment set constituted by the initial segment for each of the training temporary segment sets;

dividing the initial segment set into an initial temporary segment set made up of the initial segment constituted by data values representing a coordinate value included in a figure with respect to each of W-dimensional figures having a condition radius serving as a condition for a radius, and generate a sample segment set including a sample segment constituted by W number of data values representing a coordinate value of the centroid of the figure by the initial temporary segment set with respect to each of the initial temporary segment sets; and calculating a feature quantity of the initial segment with respect to each of the initial segments included in the initial segment set by using data values included in the initial segment and to sort the initial segments included in the initial segment set by the order of the feature quantities, wherein a first initial temporary segment set is constituted by one or more initial segments included in a first figure serving as a figure including a coordinate value represented by a top initial segment among the initial segment set after being sorted, and the initial segments included in the first initial temporary segment set other than the top initial segment are judged through initial segment judgment that judges whether each of the initial segments is included in the first figure in the order starting from a subsequent initial segment to the top initial segment.

2. The time-series data search device according to claim 1, wherein the initial segment judgment is carried out on the selected initial segment in a case where a feature quantity difference falls within a feature quantity difference range serving as a condition for a feature quantity difference, where the feature quantity difference is a difference between the feature quantity of each of the initial segments selected in the order starting from the subsequent initial segment and the feature quantity of the first centroid calculated from a coordinate value of a first centroid, namely, the centroid of the first figure, and the initial segment judgment is not carried out on the selected initial segment and its following initial segments in a case where the feature quantity difference does not fall within the feature quantity difference range.

3. The time-series data search device according to claim 2, wherein in the initial segment judgment on the selected initial segment, the selected initial segment is judged to be included in the first figure when a distance between coordinate by coordinate value represented by the selected initial segment and coordinate of the first centroid is equal to or less than the condition radius.

4. The time-series data search device according to claim 3, wherein the feature quantity of the initial segment is an average value of data values included in the initial segment, and the feature quantity of the first centroid is an average value of data values when a coordinate value of the centroid of the first figure is treated as W number of data values.

5. The time-series data search device according to claim 3, wherein the feature quantity of the initial segment is a distance between coordinate by coordinate value represented by the initial segment and a reference point, and the feature quantity of the first centroid is a distance between the first centroid and the reference point.

6. The time-series data search device according to claim 3, wherein the feature quantity of the initial segment is a whole average value obtained by averaging data values included in the initial segment and a partial average value obtained by averaging data values included in an initial partial segment extracted from the initial segment, the feature quantity of the first centroid is a centroid average value obtained by averaging data values when coordinate value of the first centroid is treated as W number of data values, the initial segments included in the initial segment set are sorted by the order of the partial average values, and the feature quantity difference is a difference between the whole average value and the centroid average value.

7. The time-series data search device according to claim 3, wherein the feature quantity of the initial segment is the degree of complexity of the initial segment calculated from a difference in data values between every two consecutive data values included in the initial segment, and the feature quantity of the first centroid is the degree of complexity of a first centroid segment calculated from a difference in data values between every two consecutive data values included in the first centroid segment when a coordinate value of the first centroid is treated as the first centroid segment constituted by W number of data values.

8. The time-series data search device according to claim 3, wherein the feature quantity of the initial segment is an initial shortest distance serving as a shortest distance between a coordinate by coordinate value represented by the initial segment and a reference plane for the initial segment, and an initial indicator value calculated from a difference between a coordinate value of the initial segment on each of coordinate axes and a coordinate value of the reference plane for the initial segment on each of the coordinate axes, the feature quantity of the first centroid is a centroid shortest distance serving as a centroid shortest distance between coordinate of the first centroid and a reference plane for the first centroid, and a centroid indicator value calculated from a difference between a coordinate value of the first centroid on each of the coordinate axes and a coordinate value of the reference plane for the first centroid on each of the coordinate axes, the initial segments included in the initial segment set are sorted by the order of the initial shortest distances, and the feature quantity difference is a sum of a difference between the initial shortest distance and the centroid shortest distance and a difference between the initial indicator value and the centroid indicator value.

9. The time-series data search device according to claim 3, wherein a type of the feature quantity of the initial segment differs between a case where solely one of a positive data value and a negative data value is included in the training time-series data and a case where both of a positive data value and a negative data value are included in the training time-series data.

10. The time-series data search device according to claim 3, wherein a type of the feature quantity of the initial segment differs between a case where a variance value calculated from an indicator value for each of the training segments falls within a variance value range serving as a condition for the variance value and a case where the variance value does not fall within the variance value range, and the indicator value of the training segment is one of a value calculated from a difference for each of coordinate axes between a coordinate value of the training segment on each of the coordinate axes and a coordinate value of a reference plane for the training segment on each of the coordinate axes and a value indicating a size of an argument of a vector representing a coordinate value of the training segment.

11. The time-series data search device according to claim 3, wherein
a type of the feature quantity of the initial segment differs between a case where a maximum value among indicator values for the respective training segments falls within a maximum value range serving as a condition for the maximum value and a case where the maximum value does not fall within the maximum value range, and
the indicator value of the training segment is one of a value calculated from a difference for each of coordinate axes between a coordinate value of the training segment on each of the coordinate axes and a coordinate value of a reference plane for the training segment on each of the coordinate axes and a value indicating a size of an argument of a vector representing coordinate value of the training segment.

12. A non-transitory computer readable medium storing a time-series data search program for causing a computer to execute:
abnormality detection processing to detect an abnormality in an appliance by comparing segments of test time-series data, which is obtained by a sensor installed at the appliance, to a set of training segments of time-series data, wherein the program causes the computer to generate by executing:
initial segment set generation processing to generate a plurality of training segments each obtained by extracting W number of data values in the order of the time series from training time-series data constituted by a plurality of data values arranged along the time series, to generate a plurality of training temporary segment sets each constituted by one or more training segments arranged in the order of the time series, to calculate, as an initial segment, W number of data values representing a coordinate value of a centroid of the training temporary segment set with respect to each of the training temporary segment sets when W number of data values included in each of the training segments in the training temporary segment set are treated as a coordinate value in a W-dimensional coordinate system, and to generate an initial segment set constituted by the initial segment for each of the training temporary segment sets;
sample segment set generation processing to divide the initial segment set into an initial temporary segment set made up of the initial segment constituted by data values representing a coordinate value included in a figure with respect to each of W-dimensional figures having a condition radius serving as a condition for a radius, and to generate a sample segment set including a sample segment constituted by W number of data values representing a coordinate value of the centroid of the figure by the initial temporary segment set with respect to each of the initial temporary segment sets; and
initial segment set sorting processing to calculate a feature quantity of the initial segment with respect to each of the initial segments included in the initial segment set by using data values included in the initial segment and to sort the initial segments included in the initial segment set by the order of the feature quantities, wherein
a first initial temporary segment set is constituted by one or more initial segments included in a first figure serving as a figure including a coordinate value represented by a top initial segment among the initial segment set after being sorted, and
the initial segments included in the first initial temporary segment set other than the top initial segment are judged through initial segment judgment that judges whether each of the initial segments is included in the first figure in the order starting from a subsequent initial segment to the top initial segment.

\* \* \* \* \*